United States Patent [19]

Sone et al.

[11] Patent Number: 5,524,217
[45] Date of Patent: Jun. 4, 1996

[54] SYSTEM HAVING DIFFERENT SIGNAL TRANSFER MODES FOR DETECTING AND RESTORING LOGICAL LEVELS AND BLOCKING OPERATION WHEN RESTORED SIGNAL OUTPUTS ARE ON A PREDETERMINED LEVEL

[75] Inventors: Hironao Sone, Yokohama; Kazuo Sekiya, Tokyo, both of Japan

[73] Assignee: International Business Machines Corporation, Armonk, N.Y.

[21] Appl. No.: 51,450

[22] Filed: Apr. 21, 1993

[30] Foreign Application Priority Data

Jun. 24, 1992 [JP] Japan ..................................... 4-165858

[51] Int. Cl.⁶ .............................. G06F 13/00; G06F 13/20
[52] U.S. Cl. ......................... 395/288; 395/306; 395/280; 395/500; 395/834; 455/26.1; 364/927.93; 364/240.2; 364/135; 364/221.6
[58] Field of Search ..................................... 395/500, 275, 395/288, 834, 306, 280; 375/104, 30, 36; 455/26.1

[56] References Cited

U.S. PATENT DOCUMENTS

| 4,311,963 | 1/1982 | Watanabe et al. | 328/163 |
|---|---|---|---|
| 5,014,284 | 5/1991 | Langer et al. | 375/30 |
| 5,101,477 | 3/1992 | Casper et al. | 395/250 |
| 5,257,289 | 10/1993 | Jopson | 375/36 |
| 5,289,459 | 2/1994 | Brownlie | 370/17 |

FOREIGN PATENT DOCUMENTS

| 3-15926 | of 0000 | Japan . |
|---|---|---|
| 56-166536 | 12/1981 | Japan . |
| 59-71527 | 4/1984 | Japan . |
| 62-251951 | 11/1987 | Japan . |
| 2-230356 | 9/1990 | Japan . |
| 3-4351 | 1/1991 | Japan . |
| 3-88055 | 4/1991 | Japan . |

OTHER PUBLICATIONS

International Business Machines Technical Disclosure Bulletin: vol. 28, No. 6, pp. 2346–2347, "Stackable Unit Packaging Concept" (Nov. 1985).
International Business Machines Technical Disclosure Bulletin: vol. 26, No. 10A, pp. 5147–5152 "Extended Data Bus with Direction and Enable Control Features" (Mar. 1984).
International Business Machines Technical Disclosure Bulletin: vol. 19, No. 8, pp. 3139–3143, "Serial Channel to I/O Interface" Jan. 1977.
"Analysis of a GaAs E–D Inverter Chain", Omar Wing, 1989, IEEE, pp. 1141–1144.

Primary Examiner—Thomas C. Lee
Assistant Examiner—Rehana Perveen Krick
Attorney, Agent, or Firm—R. S. Babayi

[57] ABSTRACT

To enable wired-OR signal lines to be connected without interlock in a bus linkage unit for connecting the bus of a computer system with the bus of an expansion device or the bus of another computer system through a signal transfer path in which the signal mode is different from those of the buses. A shadow register 46 that acts on the level of wired-OR signal line 51 of the other bus is provided in each system. The level of wired-OR signal lines in each system is sent to the shadow register of the other system through a communication path. When the shadow register of the system is at a predetermined level, said system will not send the level of said wired-OR signal line to the other system. Interlock is eliminated by avoiding repetition of level transfer echoes between both systems in this way. Both systems are further provided with a shadow-shadow register 47 for forming a mirror image of the shadow register of the other system. A predetermined level will be sent to the shadow register of the other system based on the nonconformity between the level of the shadow-shadow register in each system and the level of wired-OR signal line of said system.

7 Claims, 29 Drawing Sheets

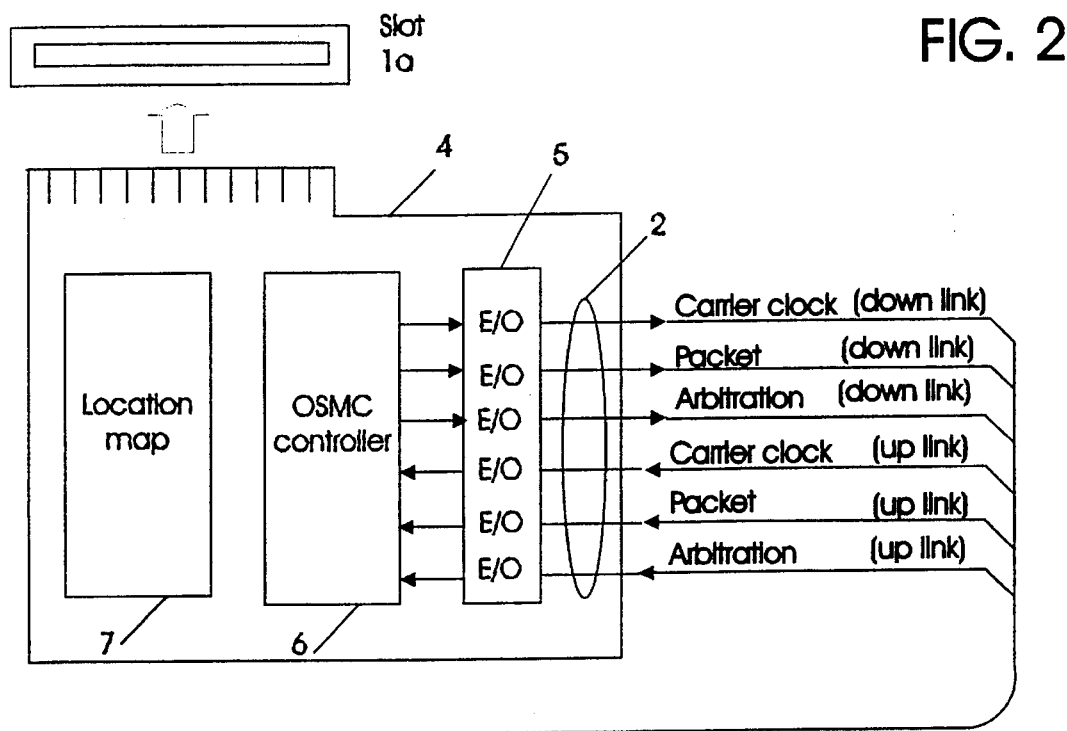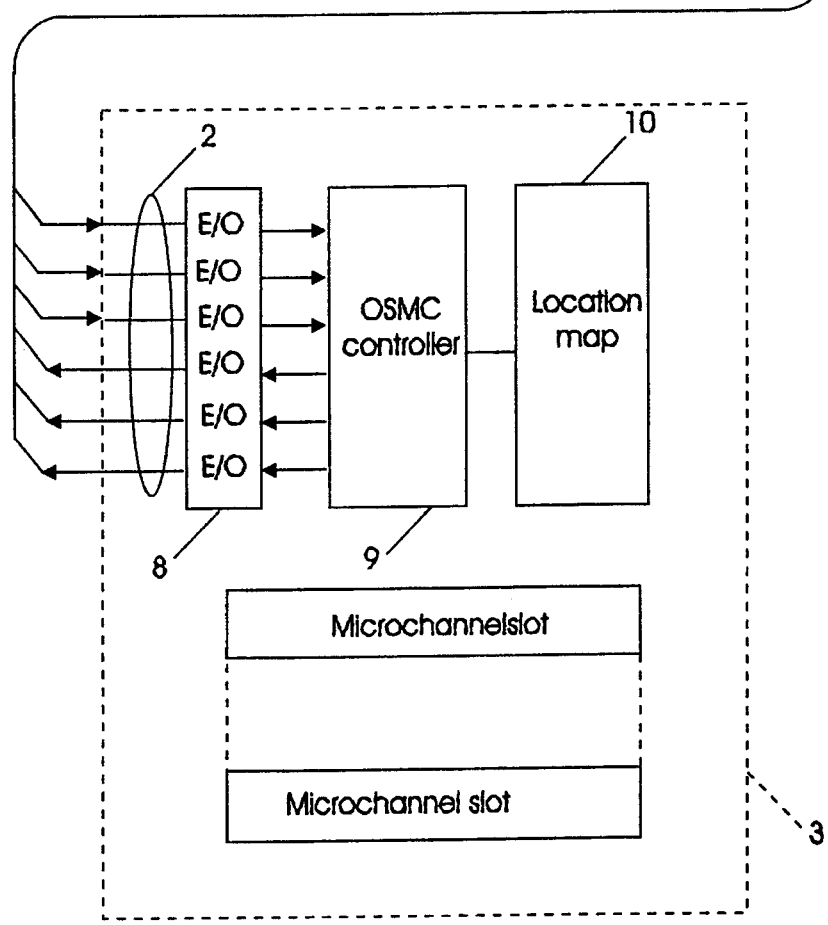
FIG. 2

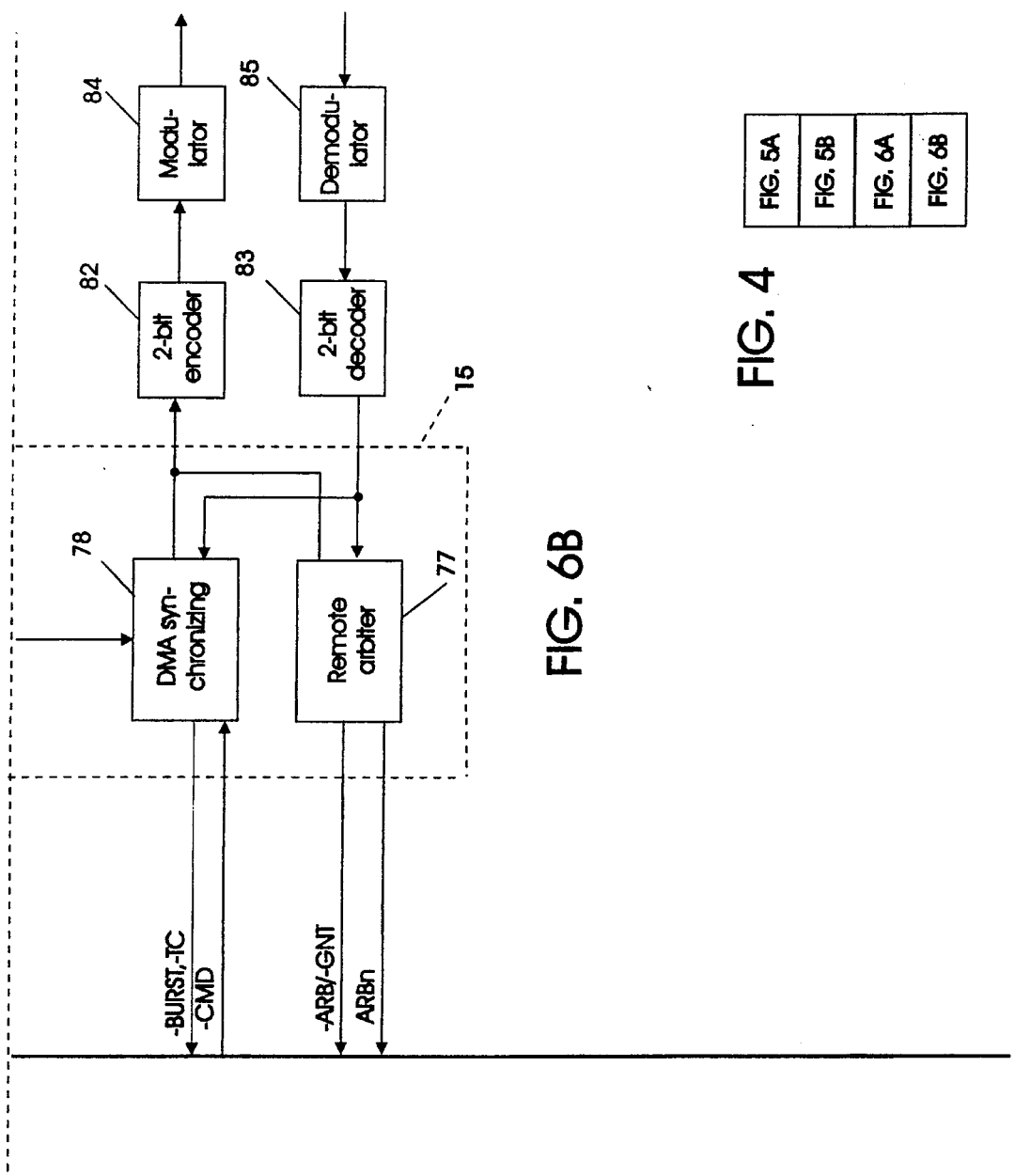

FIG. 9

| Bit 0 | Name | Detailed command |
|---|---|---|
| 1 | ACK | Positive acknowledgement to IRQ, MSC |
| 1 | NAK | Negative acknowledgement to IRQ |
| 1 | IRQ | -CHCK, -IRQ |
| 1 | MSC | CHRESET, -PREEMPT or EOT |
| 1 | BIW | Bus carry-out, I/O write |
| 1 | BIR | Bus carry-out, I/O read |
| 1 | BMW | Bus carry-out, memory write |
| 1 | BMR | Bus carry-out, memory read |
| 1 | NUL | Filler code |
| 1 | DSC | Link error notification |
| 1 | SNC | Link initiate |
| 1 | BRACK | Acknowledgement to BIW, BIR, BMW, and BMR |

FIG. 15

| Priority | Packet |
|---|---|
| 1 | DSC, SNC |
| 2 | (For retry) |
| 3 | ACK (For MSC) |
| 4 | ACK (For IRQ), NAK (For IRQ) |
| 5 | MSC |
| 6 | IRQ |
| 7 | BRACK (For BIW, BIR, BMW and BMR), BIW, BIR, BMW, BMR, Argument |
| 8 | NUL_ARG |
| 9 | NUL |

<16- BIT WRITE ACCESS TO SECONDARY 16-BIT SLAVE>

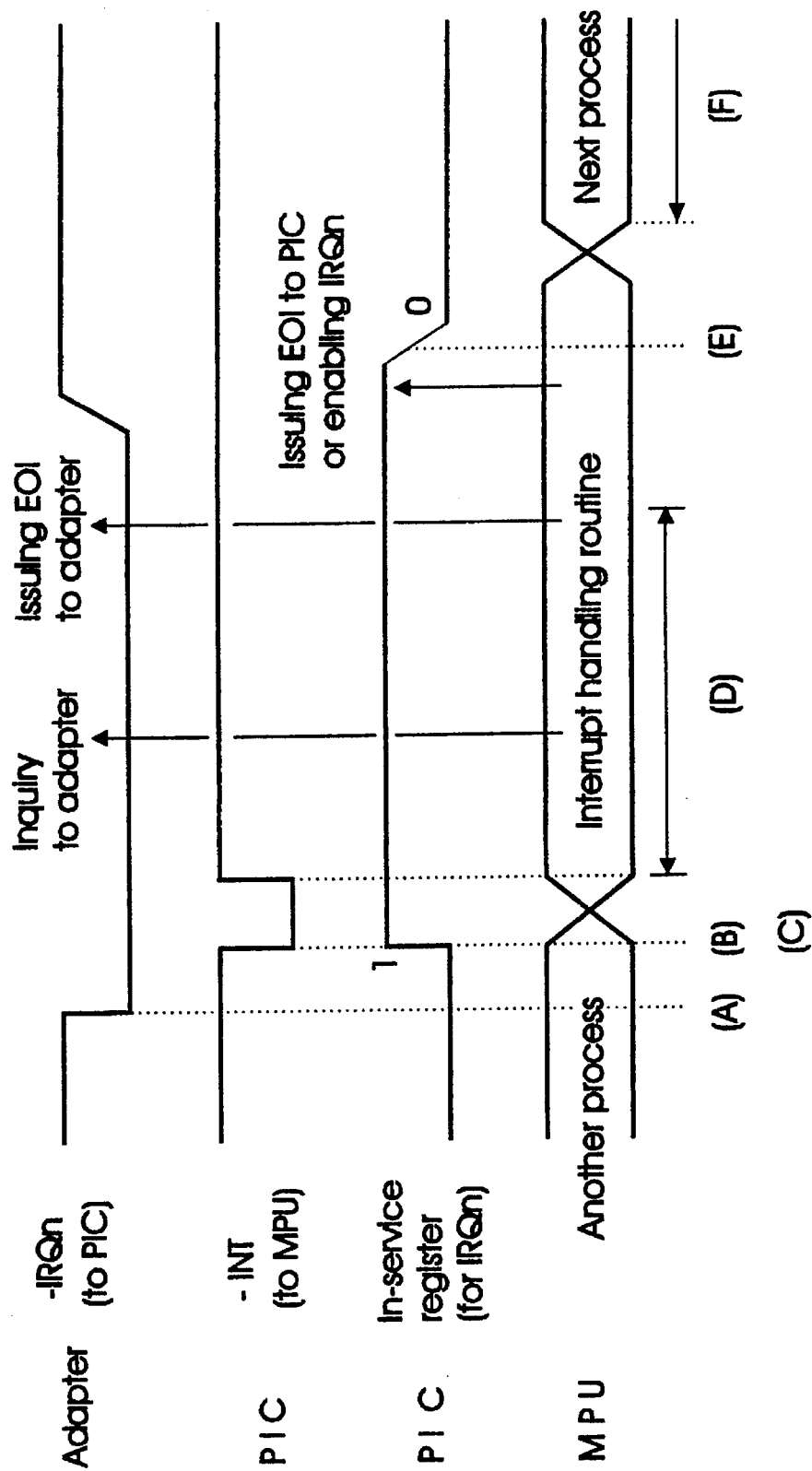

FIG. 30

| ARB/-GNT | GNT | ARB | | | | | GNT |
|---|---|---|---|---|---|---|---|
| Arbitration bus : ARB3..0 | 0000 | 1111 | 1000 | 1011 | 1010 |
| Previous Winner : 0000 | 0000 | →ZZZZ | ZZZZ | ZZZZ | ZZZZ | 1010 |
| Participant A: 1010 | ZZZZ | →1ZZZ | →1010 | →101Z | →1010 | |
| Participant B: 1011 | ZZZZ | →1ZZZ | →1011 | →101Z | 101Z | |
| Participant C: 1101 | ZZZZ | →1ZZZ | →1101 | →11ZZ | 11ZZ | |
| | | Toff + Trc | Ton | Toff + Trc | Ton | |

FIG. 33
| | |
|---|---|
| ARB/-GNT of PC bus | ⎯⎯⎯⎯⏋_____⎿⎯⎯⎯ |
XCLOCK of
PC side
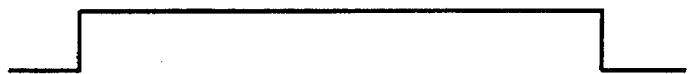
```
               11111 1111122222222223
     1234567890 1234 5678901234567890
```
Code on
arbitration link
(PC→expansion)
```
0000 11 111111111111       111111111110000
1111 00C000000000000AAAAAAAAA00000001111
     D                32103210
```
| | |
|---|---|
| ARB/-GNT of expansion box | ⎯⎯⎯⎯⏋_____⎿⎯⎯ |
XCLOCK of
expansion box
side
```
               11111 1111122222222223
     1234567890 1234 5678901234567890
```
Code on
arbitration link
(PC→expansion)
```
0000000011 1111   111111111111111110000
1111111100C0000AAAAAAAAA00000000000001111
          D       32103210
```

SYSTEM HAVING DIFFERENT SIGNAL TRANSFER MODES FOR DETECTING AND RESTORING LOGICAL LEVELS AND BLOCKING OPERATION WHEN RESTORED SIGNAL OUTPUTS ARE ON A PREDETERMINED LEVEL

BACKGROUND OF THE INVENTION

1. Field of the Invention

This invention relates to a bus linkage unit for connecting a bus of a computer system with a bus of an expansion box or a bus of another computer system through a signal transfer path in which the signal mode is different from that of said buses, and more particularly, a bus linkage unit for enabling wired-OR signal lines to be connected without interlocking.

2. Prior Art

When the functions of a conventional personal computer are expanded, it is conventional to lead out all signal lines of the bus through a connector or the like to connect to a bus within an expansion box. However, as the performance of personal computers is more and more sophisticated year after year, high speed signals increase in these over the bus, and the number of signal lines significantly increases for the bus, resulting in the following problems:

(1) The waveforms of signals are distorted as the signal lines, through which high-speed signals are carried, are extended.

(2) High-speed signals give causes a problem of unnecessary emission.

(3) External noise tends to easily intrude, causing malfunctions.

(4) The increased number of signal lines necessitates using multicontact connectors.

(5) Use of multicontact connectors tends to lower reliability.

These problems used to put severe restrictions on the extendibility of sophisticated personal computers. To code with these problems, it is proposed to link a bus of a computer to a bus of another computer or a bus of peripheral equipment through a communication link.

For instance, the computer system disclosed in Published Unexamined Patent Application (PUPA) No. 59071527 is to link a host processor and remote equipment with one communication link, and to support cycle stealing transfer.

Also, the system bus data linkage unit disclosed in PUPA No. 3-4351, is to provide special linkage modules for the respective parallel buses in order to connect, for example, two parallel buses with a serial link. Thus, when data is sent from the system initiator of one parallel bus to the system target of the other parallel bus, the link module of the one parallel bus simulates the other parallel data, and converts the parallel data into serial data, which is then sent to the other parallel bus. The link module of the other parallel bus converts the serial data into parallel data, simulates the system initiator, and transfers the parallel data to the system target. In such a configuration as mentioned above where two systems are connected through a communication path, attention must be paid to the handling of wired-OR signal lines. That is, in a bus of a personal computer or the like, negative logic OR is taken on signal lines in some cases by driving the same signal line with an open collector or open-drain type drive element so that an unspecified number of devices can transfer a specific request. An example of such a signal line is the interrupt request signal line in the bus architecture in the specifications for MicroChannel (a trademark of International Business Machines Corporation). If such signal lines are connected through a transfer path in which a signal mode is different from that of the bus, such as an optical fiber communication path for example, so that signal levels are simply transferred with each other and participated in wired-OR by an open collector at the destination of each communication path, a stiff situation such as the following is generated (interlock).

(1) In one system, one device drives signal lines to low voltage level, this level is transferred to the other system through a communication path, and the signal lines in that system are driven to low voltage level. Then, the low voltage level of the signal lines of said other system is transferred to said one system, and the signal lines of said system are driven to low voltage level. Even if said device stops the low voltage drive in said one system, signal lines are continued to be driven to low voltage level sent from the communication path.

(2) The above problem can be prevented through the communication path if the communication path itself is driving to low voltage level. However, if separate devices drive the same signal to low voltage at the same time on both sides of the communication path, there arises such a situation as that the communication path continuing to drive both sides to low voltage level occurs.

The following are prior art references relevant to this invention:

IBM Technical Disclosure Bulletin, Vol. 28, No. 6, pp. 2346–2347, "STACKABLE UNIT PACKAGING CONCEPT," (Nov. 1985): This publication discloses a technique for connecting signal lines between two functional units through a connector by putting one functional unit on the housing of the other functional unit equipped with extendable buses.

IBM Technical Disclosure Bulletin, Vol. 26, No. 10A, pp. 5147 –5152, "EXTENDED DATA BUS WITH DIRECTION AND ENABLE CONTROL FEATURES," (March 1984): This publication discloses a method of controlling data transfer directions such that a computer system and an expansion system are linked in parallel and directions of data transfer are controlled by detecting from which of the two systems the DMA request in question has been issued.

PUPA No. 56-166536: This gazette discloses a technique for asynchronous communication between interface buses such that a pair of extenders are installed between two interface buses, and asynchronous communication control is exercised between the extenders to establish asynchronous communication between the interface buses. It also discloses a technique for connecting two buses in parallel through the use of an optical cable.

IBM Technical Disclosure Bulletin, Vol. 19, No. 8, pp. 3139–3143, "SERIAL CHANNEL TO I/O INTERFACE," (Jan. 1977): This publication discloses a serial I/O interface replacing a parallel I/O interface. This interface allows data to be transferred serially by use of frames or packets each consisting of a flag and its subsequent serial data.

PUPA No. 3-88055, 1991: This gazette discloses a technique for setting up a data chain (CCW record) flag and a command chain (CCW record link) flag in an extender connecting a serial channel to a device on a parallel bus.

Patent application Ser. No. 3-15926: This patent application describes an invention relating to speeding up serial data transfer between a channel and a device by use of a microcode routine.

PUPA No. 62-251951: This patent application discloses the invention whereby a transfer byte count can be included in the command field of an extender connecting a serial channel with a parallel device.

PUPA No. 2-230356, 1990: This patent application describes a technique for holding levels in registers and looking in via main system when an interrupt signal is notified to the main system from an expansion system.

PUPA No. 1-93941, 1989: This patent application describes a technique for serially transferring a snap shot of parallel signals and holding said transferred signals in shift registers.

However, none of the above references mentions about the interlock of wired-OR signal lines that is generated when the buses of two different systems are connected by a transfer path in which the signal mode is different from those of the buses.

SUMMARY OF THE INVENTION

Problems to be solved by the invention

The purpose of this invention is to eliminate the interlock of wired-OR signal lines mentioned above.

Means for solving the problems

This invention adopts the following configuration to achieve the above purpose. First, a shadow register that acts for the level of a wired-OR signal line of the other bus is provided in both a first system and a second system that are connected through a communication path in a signal transfer mode different from the ordinary bus signal transfer mode. The levels of wired-OR signal lines of each system are sent to the shadow registers of the other system through a communication path. When the shadow register of the system is at a predetermined level, the level of said wired-OR signal lines will not be sent to the other system. Interlock is eliminated by avoiding repetition of echoes of level transfer between both systems in this way. Both systems are, further, provided with shadow-shadow registers for forming mirror images of the shadow registers of the other system. Since the level transfer to a shadow register is prohibited as mentioned above (because the shadow register of the other system is at a predetermined level), there is a case that a shadow register is temporarily unable to reproduce the predetermined wired-OR level. But, the level will be sent to the shadow register of the other system according to the nonconformity between the level of the shadow-shadow register of said system and the level of the wired-OR signal line when the shadow register of said other system is released from the predetermined level. In this way, levels are reliably transferred to each other while interlock caused by echoes is avoided.

In addition, when levels are simultaneously transferred, a shadow register in one system only receives the level while the shadow register of the other system discards the transferred levels. In this way, interlock caused by simultaneous transfer can also be avoided. Also in this case, levels are sent by shadow-shadow registers at an appropriate point later in time.

DRAWINGS

The following describes an embodiment of this invention with reference to the relevant drawings:

FIG. 2 is a block diagram of the overall configuration of the above-mentioned embodiment;

FIG. 4 is a diagram showing the positional relationship between FIGS. 5 and 6;

FIG. 9 is a diagram illustrating the types of packets used in the above-mentioned embodiment;

FIG. 15 is a diagram illustrating the sending sequence of the above-mentioned packets;

FIG. 20 is a timing chart explaining interruption;

FIG. 30 is a timing chart which explains conventional arbitration by a local arbiter;

FIG. 33 is a timing chart which explains the behavior of the remote arbiter 77 shown in FIG. 6.

DETAILED DESCRIPTION

Figure 1:
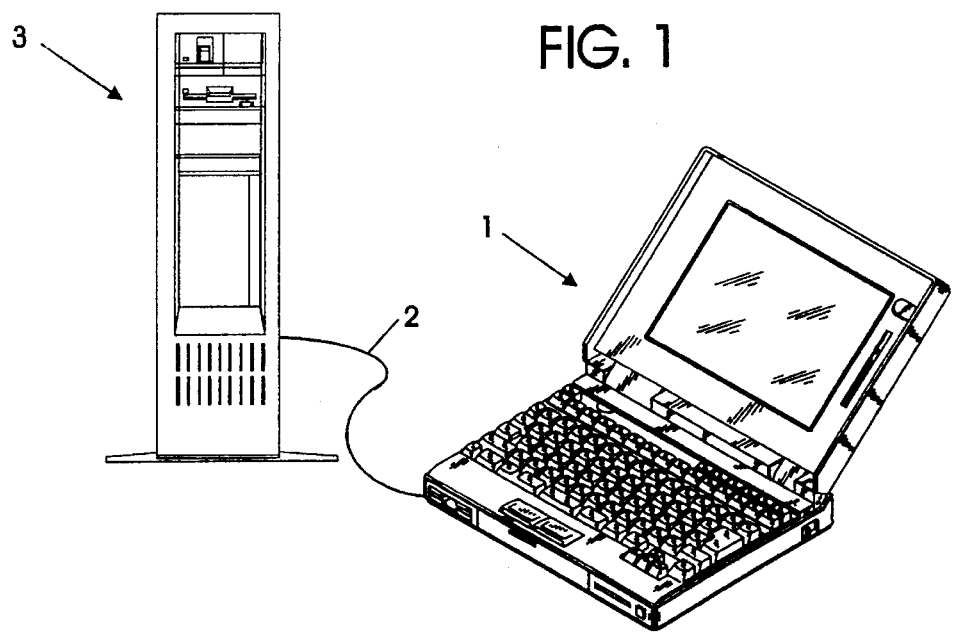
FIG. 1 is a diagram showing the use mode of an embodiment of this invention.

FIG. 1 shows the use mode of an embodiment of this invention. In the figure, 1 refers to a notebook-type compact personal computer, which is connected through an optical fiber assembly 2 to an expansion box 3. This personal computer 1 may be for example, a PS/55 notebook computer from IBM Japan, Ltd., which employ a bus conforming to specifications of the Microchannel (a trademark of International Business Machines Corporation). The expansion box 3 has slots for the MicroChannel, an SCSI standard slot (for a DASD), a serial port, a parallel port, and so on.

As shown in FIG. 2, an optical serial card (OSMC) 4 is mounted in the predetermined slot la of the personal computer 1. The OSMC card 4 is installed with an electro-opto conversion assembly 5, an OSMC controller 6, and a location map (SRAM) 7. On the other hand, the expansion box 3, also contains an electro-opto conversion assembly 8, an OSMC, controller 9, and a location map (SRAM) 10. Then, an optical fiber assembly 2 is connected between the electro-opto conversion assembly 5 and the expansion box 3. The optical fiber assembly 2 consists of six optical fiber links, and was a length of, for example, 10 meters. These optical fiber links are a carrier clock link, a packet link, and an arbitration link transmitting signals from the personal computer 1 to the expansion box a as well as a carrier clock link, a packet link, and an arbitration link transmitting signals from the expansion box 3 to the personal computer 1.

Figure 3:
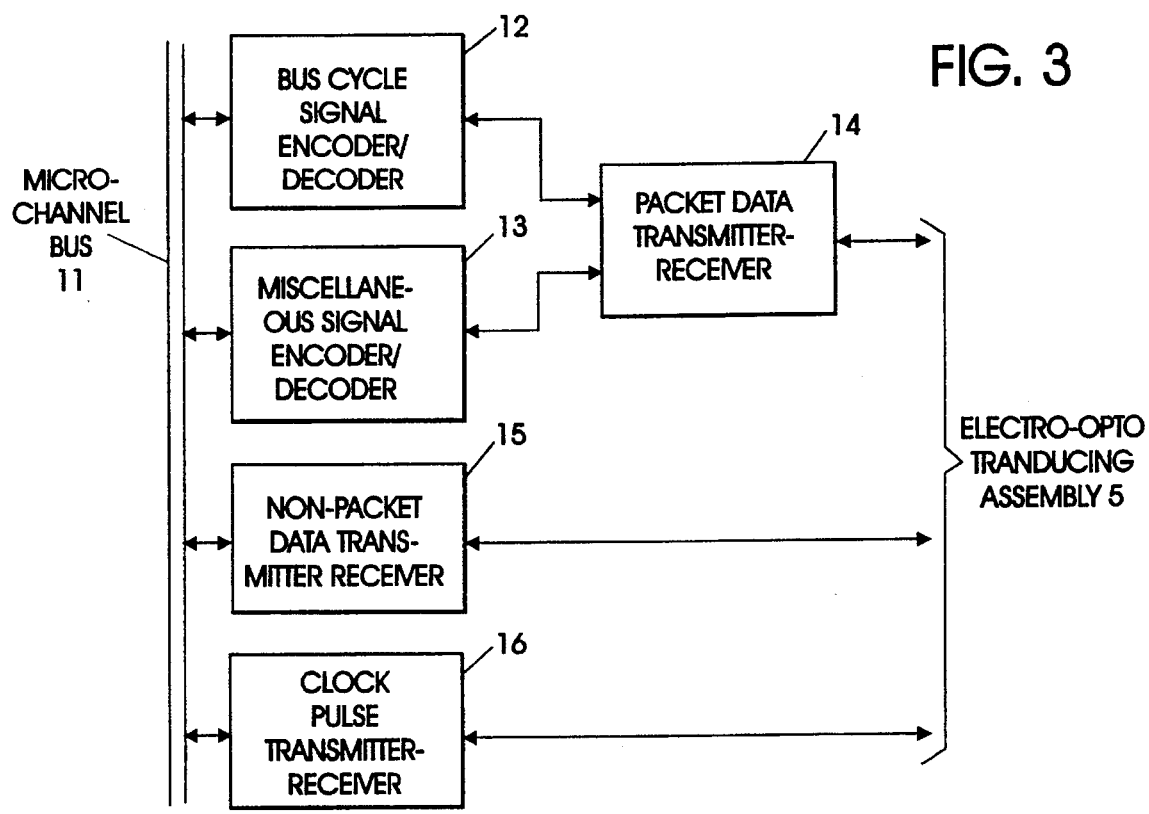
FIG. 3 is a block diagram of the configuration of the OSMC controller as the fundamental part of the above-mentioned embodiment.

FIG. 3 shows the configuration of the OSMC controller 6 of the OSMC card 4 and the configuration of the OSMC controller 9 of the expansion box. The OSMC controller 6 has substantially the same configuration as the OSMC controller 9. In the following, it does not matter which of the two OSMC controllers is referred to, except when especially necessary. For convenience of reference, instead, we shall call the one directly referred to as "the primary" and the other as "the secondary."

In FIG. 3, there is an interface with a bus 11 meeting the MicroChannel specifications of the primary system on the left side. On the right side, there are interfaces with an electro-opto conversion assembly 5 (reference numeral, used being those on the personal computer 1, except when necessary) and an optical fiber assembly 2 (FIG. 2). An OSMC controller 6, consists of a bus cycle signal encoder/decoder 12, a miscellaneous signal encoder/decoder 13, a packet data transmitter-receiver 14, a non-packet data transmitter-receiver 15, a clock transmitter-receiver 16, and the like. The signals on bus 11 conform tothe MicroChannel architecture, and are described in detail at the end of the specification in the section "Explanation of Signal over MicroChannel Architecture"/ The bus signals are converted by the bus cycle signal encoder/decoder 12, miscellaneous signal encoder/decoder 13, packet data transmitter-receiver 14, and non-packet data transmitter-receiver 15. The resulting signals are then partially omitted before being sent through the electro-opto conversion assembly 8 of the primary system to the secondary system. Signals over the MicroChannel of the secondary system are similarly converted and partially omitted before being sent through the electro-opto conversion assembly 8 of the secondary system to the primary system.

The optical signals thus sent to the primary system are fed through the electro-opto conversion assembly 5 of the primary system to the bus cycle signal encoder/decoder 12, miscellaneous signal encoder/decoder 13, packet data transmitter-receiver 14, and the non-packet data transmitter-receiver 15, where they are restored to the MicroChannel signals. The optical signals sent to the second any system are also restored to the MicroChannel signals.

In the OSMC controller shown in FIG. 3, signals (among other signals) passing over the MicroChannel which are problematic with respect to a delay in timing are processed by the non-packet data transmitter 15; signals relating to bus cycles are processed by the bus cycle signal encoder/decoder 12 and the packet data transmitter-receiver 14; and the remaining signals are processed by the miscellaneous signal encoder/decoder 13 and the packet data transmitter-receiver 14.

Bus cycle signal encoder/decoder

Figure 5A:
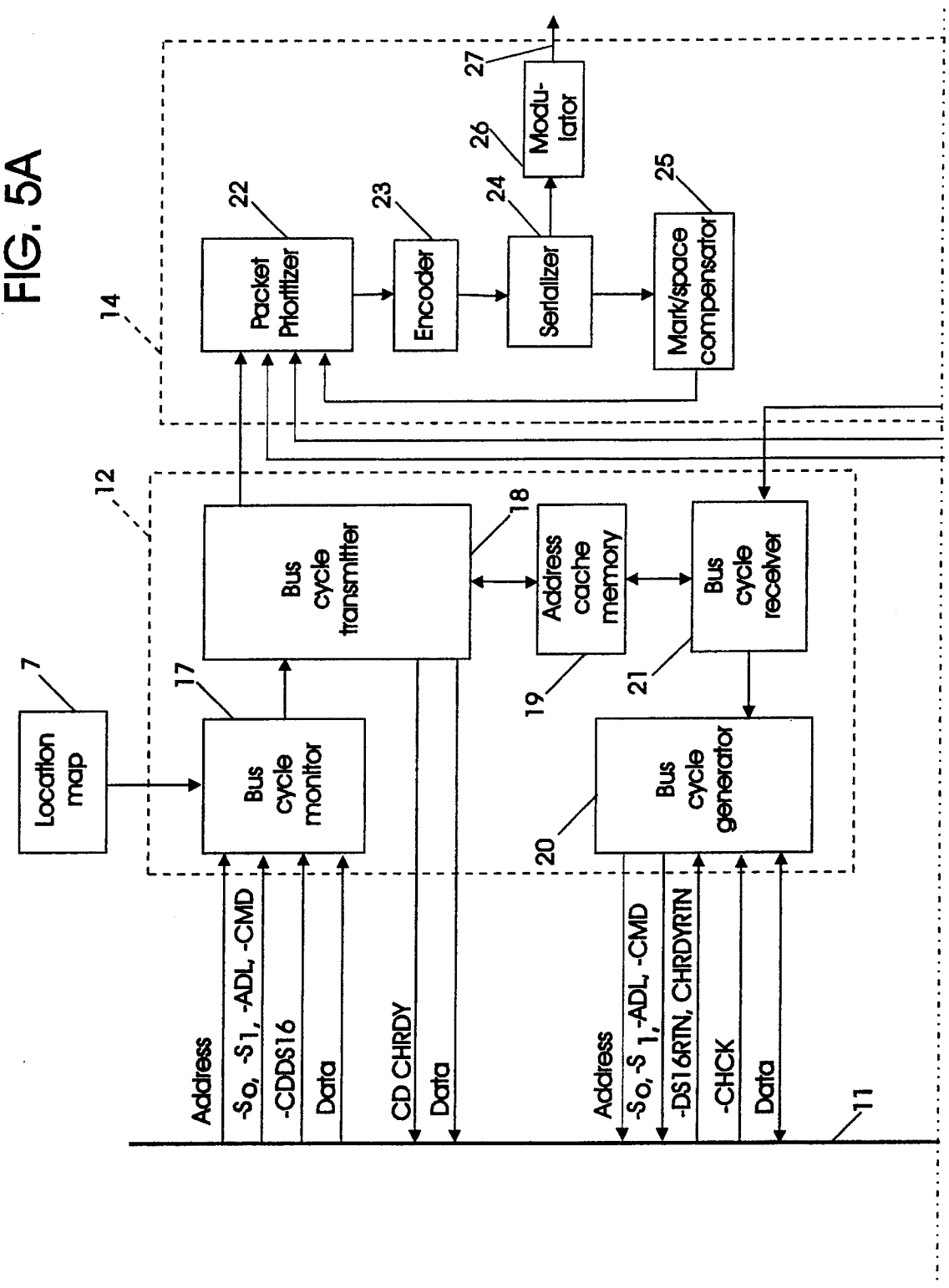
FIG. 5 is a block diagram showing the details of the OSMC controller shown in FIG. 3.
Figure 5B:
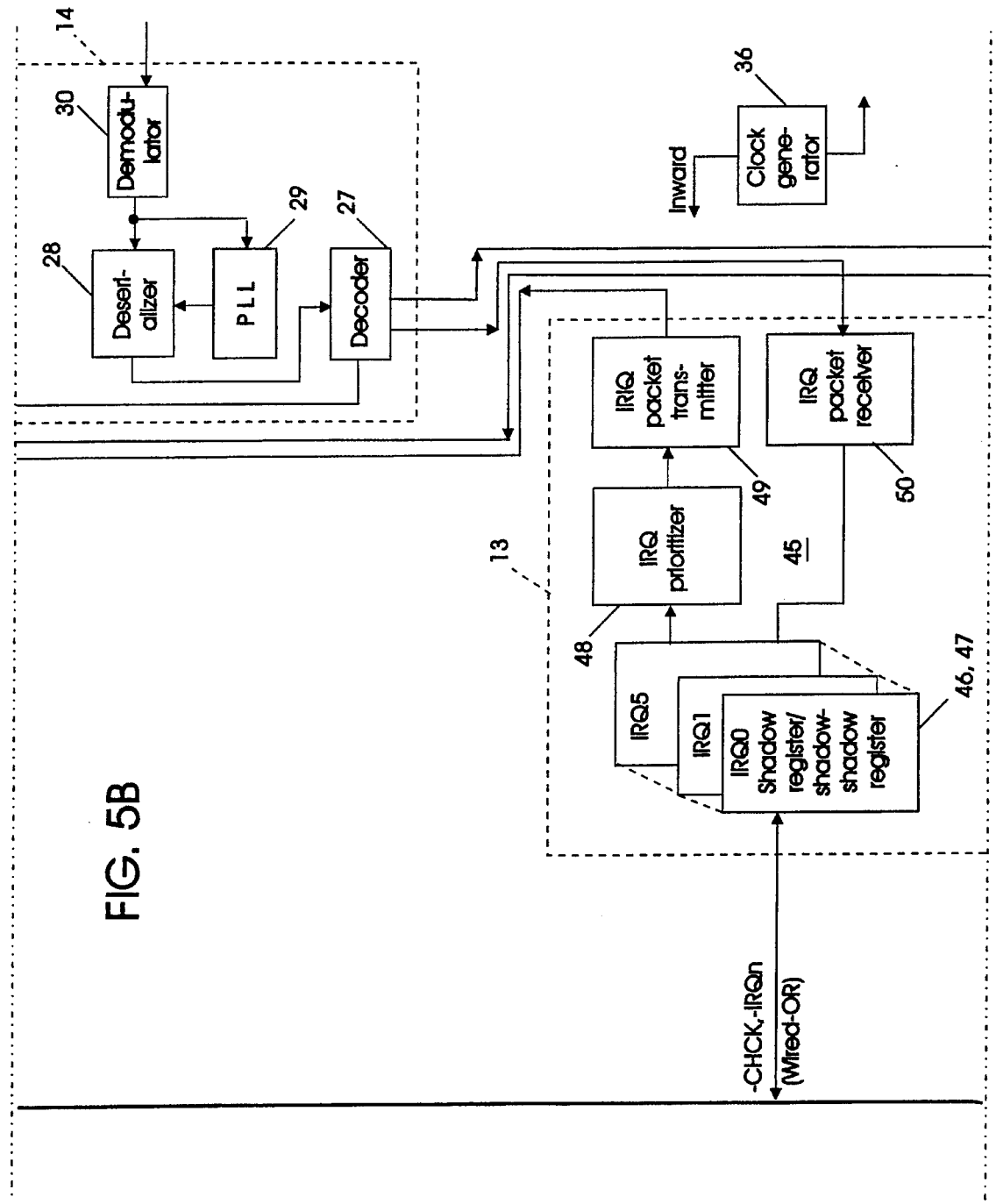
Figure 6A:
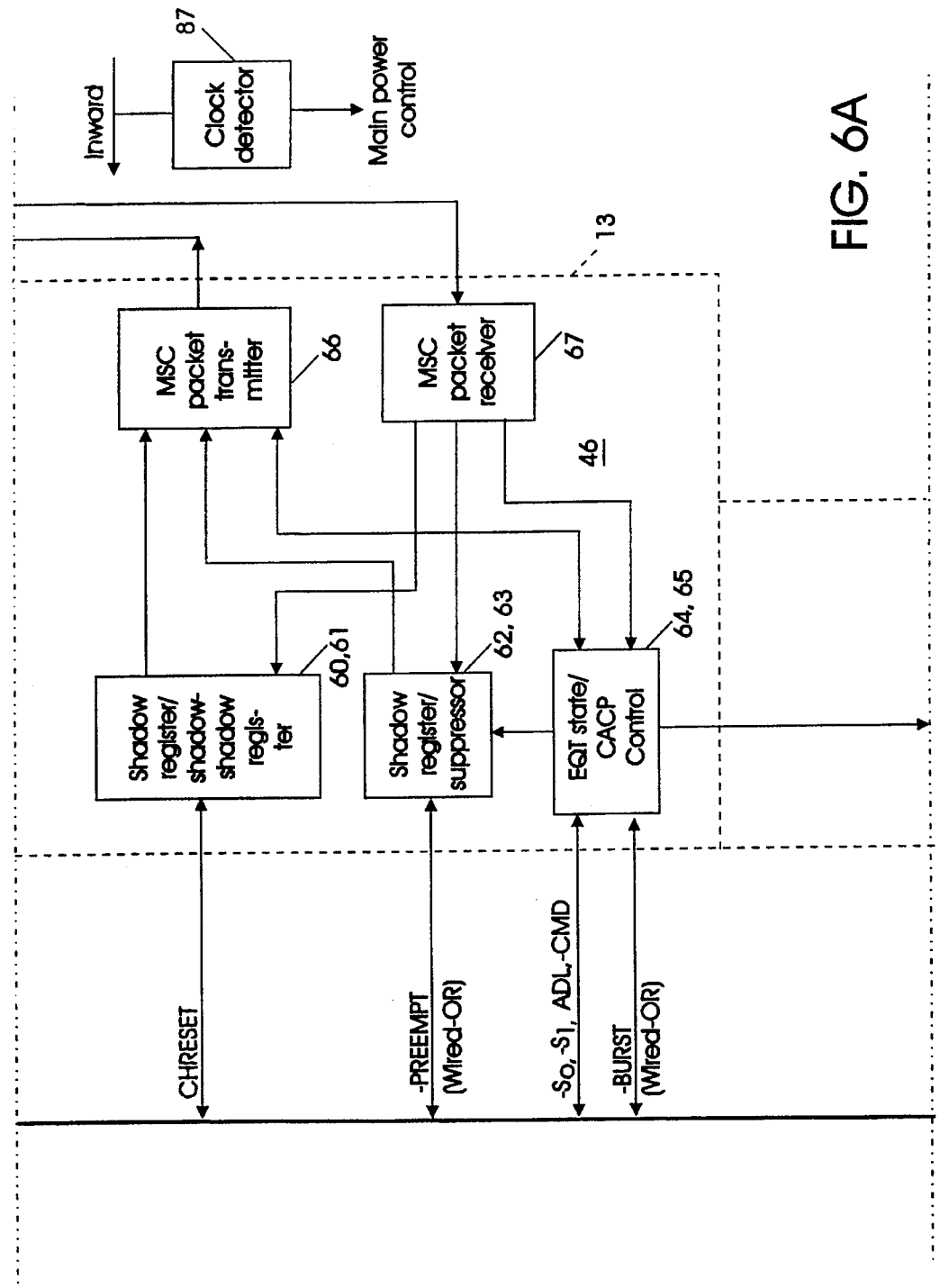
FIG. 6 is a block diagram showing the details of the OSMC controller shown in FIG. 3.

FIGS. 5 and 6 shows the details for FIG. 3. FIG. 4 shows the positional relationship between FIGS. 5 and 6. FIG. 5, especially, shows the bus cycle signal encoder/decoder 12 and the packet data transmitter-receiver 14. In the figure, the bus cycle signal encoder/decoder 12 consists of a bus cycle monitor 17, a bus cycle transmitter 18, an address cache 19, a bus cycle generator 20, and a bus cycle receiver 21.

Bus cycle monitor

Figure 7:
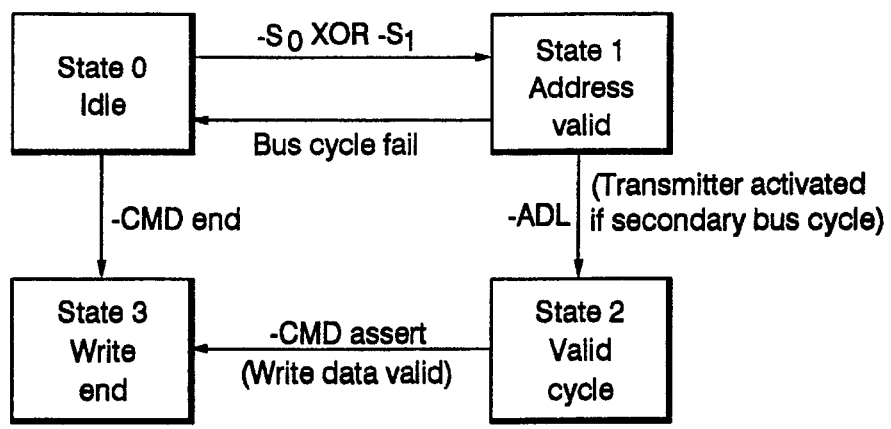
FIG. 7 is a diagram illustrating the operation of the bus cycle monitor 17 shown in FIG. 5.

The bus cycle monitor 17 operates as shown in FIG. 7, with the following states of operation:

State 0; idle state
   Makes a transition to state 2 if -S0 or -S1 is asserted.
State 1; address is valid
   Makes a transition to state 2 if -ADL is asserted and address is detected on the location map 7. Makes a transition to state 0 if -S0 and -S1 are negated.
State 2; the bus cycle transmitter 18 is kicked if the bus cycle is a secondary bus cycle.
   Makes a transition to state 3 if -CMD is detected.
State 3; write data is valid if the cycle is a write cycle.
   Makes a transition to state 0 if -CMD is negated.

Bus cycle transmitter

The bus cycle transmitter 18 requests the packet data transmitter-receiver 14 to packetize MicroChannel signals relating to a bus cycle started at the primary system and to be completed at the secondary system and to transfer packets. The packet data transmitter-receiver 14 generates a packet in reply to a request for signal transfer and transmits the packet to the secondary system. The packet thus transmitted to the secondary system is used to regenerate MicroChannel signals. As shown in FIG. 8, a packet consists of a command field, an argument field, and a compensation field, which are each composed of 10 bits. The types of commands are as shown in FIG. 9. The argument field is buried with an address and transfer data. The compensation field is buried in a packet when no other field is transferred. The null argument in the compensation field takes one of a plurality of specific bit patterns. It is arranged to eliminate direct current in the transferred signals by appropriately selecting a bit pattern for the null argument. The packet transmitter-receiver 14 will be detailed later.

The bus cycle transmitter 18 is arranged to be able to eliminate the transfer of address information by taking advantage of the locality of bus cycle addresses. That is, the address cache 19 is designed so that it can store a previous bus access address, in order that the command field contains the corresponding information if the difference between the current address and the previous address is 0, 1, or 2 and the transfer of the previous address is eliminated instead.

Figure 10:
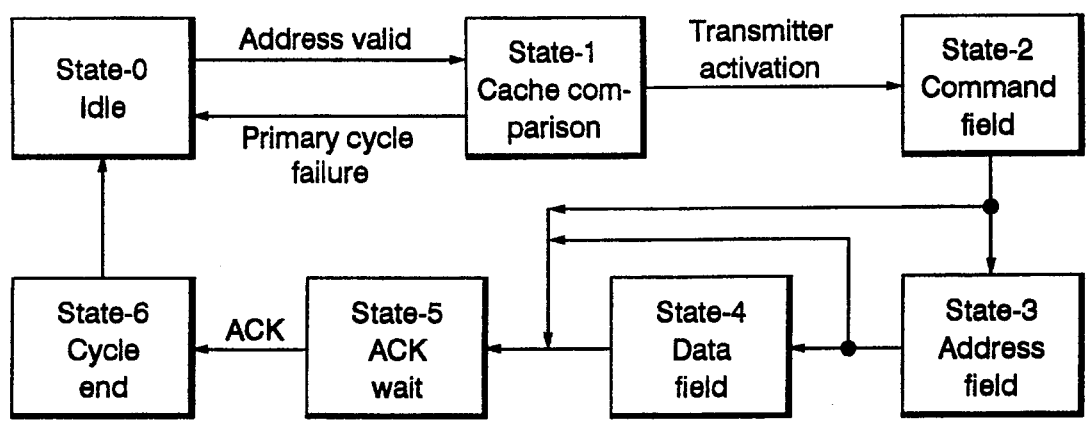
FIG. 10 is a diagram illustrating the operation of the bus cycle transmitter 18 shown in FIG. 5.
Figure 8A:
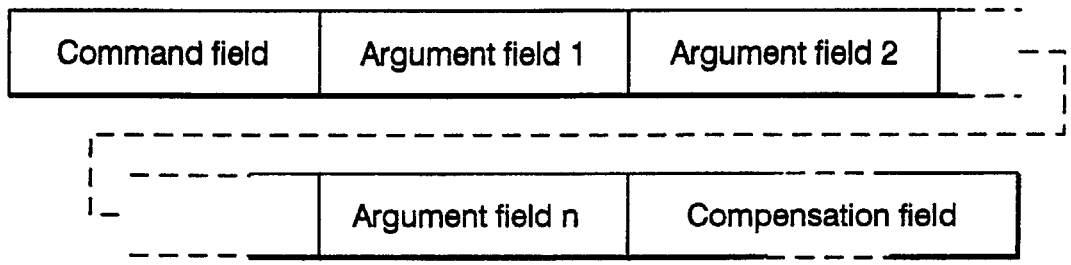
FIG. 8 is a diagram illustrating the packet configuration of the above-mentioned embodiment.
Figure 8B:
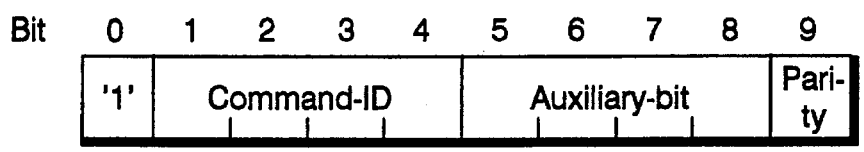
Figure 8C:
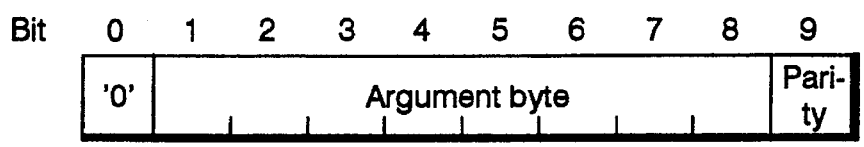
Figure 8D:
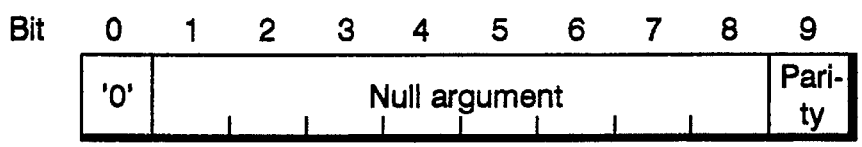

The bus cycle transmitter 18 operates as shown in FIG. 10, with the following states of operation:

State 0; idle state

Makes a transition to state 1 if the bus cycle monitor 17 detects a bus cycle State 1; accesses the address cache 19 and compares a bus address with a cache address.

If the bus address minus the cache address is 0, +1, or +2, a cache hit is scored; otherwise, a cache miss is scored.

If the bus cycle monitor activates the bus cycle transmitter 18, a transition is made to state 2. Otherwise, a transition is made to state 0.

State 2; requests to send a command packet, and negates CDCHRDY.

The address cache 19 is updated.

If a cache hit is scored and a read operation is performed, a transition is made to state 5.

If a cache hit is scored and a write operation is performed, a transition is made to state 4.

If a cache miss is scored, a transition is made to state 3.

State 3; requests to send an address packet.

If a read operation is performed, a transition is made to state 5.

If a write operation is performed, a transition is made to state 4.

State 4; requests to send a data packet and makes a transition to state 5.

State 5; Waits for the completion of a bus cycle sent to the secondary system.

A transition is made to state 6 if an acknowledgement of the secondary bus cycle is returned.

State 6; asserts CDCHRDY

If a read operation is performed, returned data is output.

A transition is made to state 0.

Bus cycle receiver

The bus cycle receiver 21 activates the bus cycle generator 20 according to information about bus cycles to be transferred from the secondary system to the primary system to reproduce the bus cycle signals of the secondary system in the primary system. The packet data transmitter-receiver 14 decodes packets from the secondary system and sends them to a bus cycle receiver 21. The bus cycle receiver 21 generates addresses by reference to the address cache 19, if necessary, and feeds the addresses to the bus cycle generator 20. The bus cycle receiver 21 also requests the packet data transmitter-receiver 14 to send an ACK packet to the primary system when the bus cycle sent from the secondary system to the primary system is about to be completed.

Figure 11:
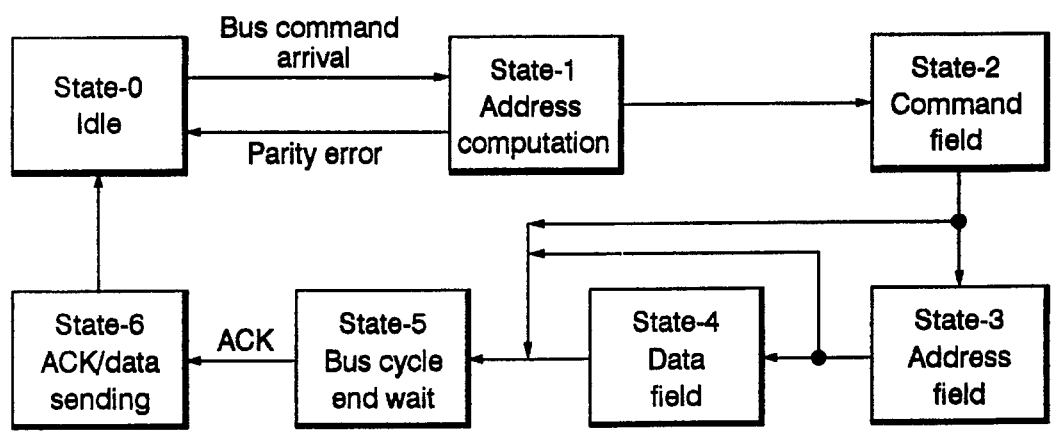
FIG. 11 is a diagram illustrating the bus cycle receiver 21 shown in FIG. 5.

The bus cycle receiver 21 operates as shown in FIG. 11, with the following states of operation:

State 0; idles state

Makes a transition to state 1 if a primary bus cycle command is identified.

State 1; calculates effective address by use of the cache state data of the command packet.

If the address incremental value is 11, the corresponding cache address is discarded.

State 2; completes the reception of the command packet.

If a parity error is detected, a transition is made to state 1 and an error flag is set.

If a cache hit is scored, the bus cycle generator 20 is kicked and the address cache 19 is updated.

If a cache hit is scored and a read operation is performed, a transition is made to state 5.

If a cache hit is scored and a write operation is performed, a transition is made to state 4.

If a cache miss is detected, a transition is made to state 3.

State 3; receives an address packet. After all the addresses are received, the bus cycle generator 20 is kicked and the address cache 19 is updated.

If a read operation is performed, a transition is made to state 5.

If a write operation is performed, a transition is made to state 4.

State 4; receives a data packet and makes a transition to state 5.

State 5; waits until a bus cycle sent to the secondary system is about to end.

If the bus cycle generator 20 makes notification that a bus cycle is about to end, a transition is made to state 6.

State 6; makes a request to send an ACK packet for a bus cycle started in the secondary system.

If a read operation is to be performed, a request is made to send a packet of read data.

A transition is made to state 0.

Bus cycle generator

The bus cycle generator 20 reproduces a bus cycle started in the secondary system in the primary system. When the bus cycle generator 20 becomes ready to output an effective address, the bus cycle receiver 21 activates the bus cycle generator 20. Signals over the MicroChannel of the primary system to the bus cycle reproduced by the bus cycle generator 20 are sent to the MicroChannel bus 11 of the secondary system.

Figure 12:
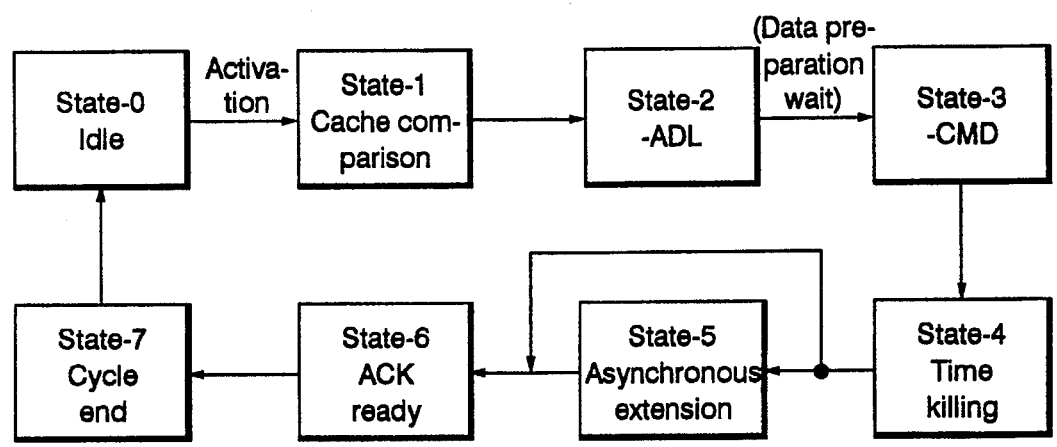
FIG. 12 is a diagram illustrating the operation of the bus cycle generator 20 shown in FIG. 5.

The bus cycle generator 20 operates as shown in FIG. 12, with the following states of operation:

State 0; idle state

If the generator 20 is kicked by the bus cycle receiver, a transition is made to state 1.

State 1; asserts -S0 or -S1 and makes a transition to state 2.

State 2; asserts -ADL.

If a read operation is performed, a transition is made to state 3.

If a write operation is performed, a transition is made to state 3 as soon as data arrives.

State 3; negates -ADL and asserts -CMD.

It samples CHRDYTN and distinguishes between a default cycle and an extended cycle.

State 4; negates -S0 or -S1.

If the cycle is a default cycle, a state transition to state 6 is made 40 ns later than the assertion of -CMD.

If the cycle is an extended cycle, a state transition to state 6 is made 140 ns later than the assertion of -CMD if CHRDYRTN is at high voltage level, or to state 5 if CHRDYRTN is low voltage level.

State 5; asynchronous extended cycle.

A transition is made to state 6 as soon as CHRDYRTN becomes high voltage level.

State 6; notifies the bus cycle receiver 21 that it is ready to return an ACK.

A transition is made to state 7, 60 ns later.

State 7; terminates the bus cycle.

If the bus cycle is not a DMA IO cycle, it negates —CMD and goes to state 0.

If the bus cycle is a DMA IO cycle, the generator 20 waits until -TC is received, or negates -CMD after receiving the end of -CMD over the secondary bus through an arbitration link, and then goes to state 0.

Figure 13:
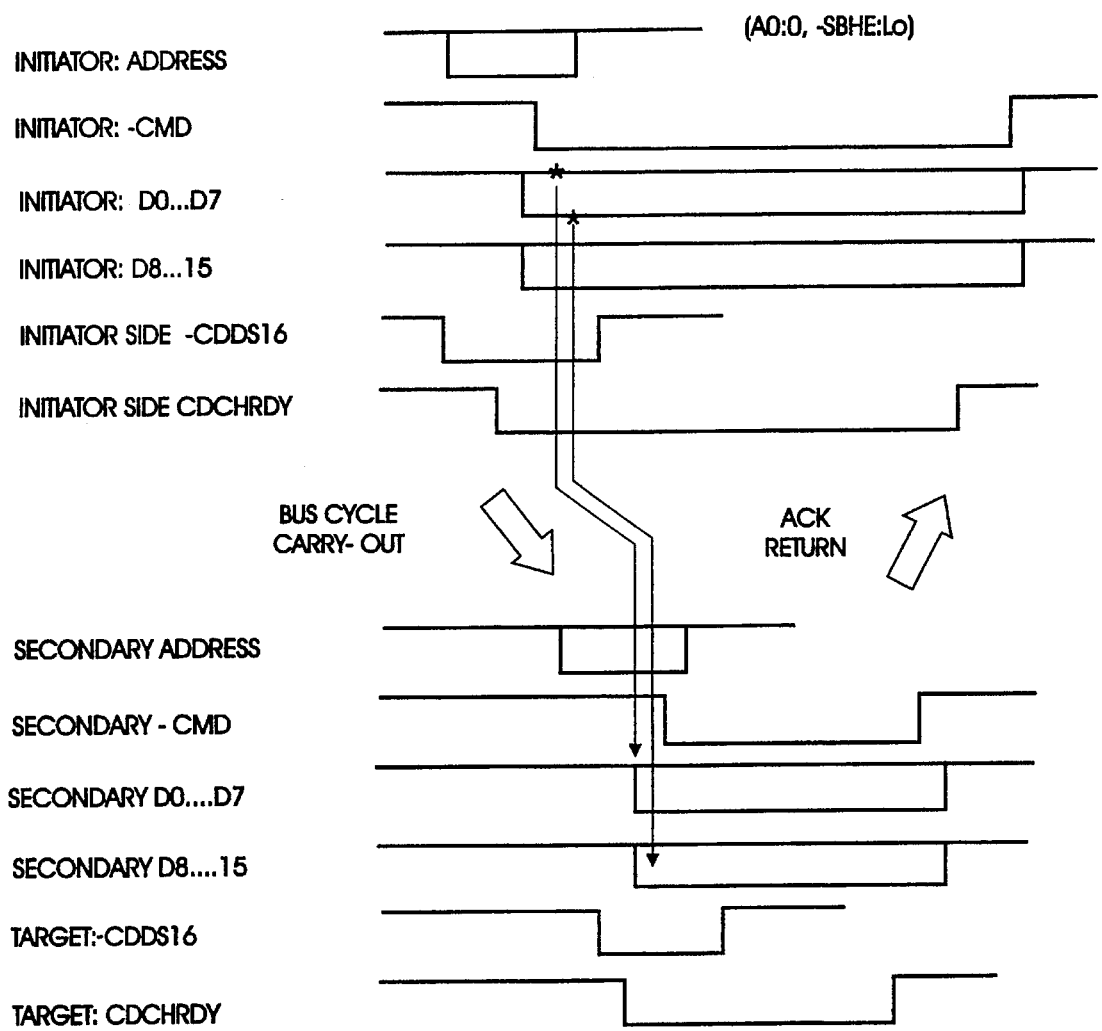
FIG. 13 is a diagram illustrating the operation of bus cycles.
Figure 14:
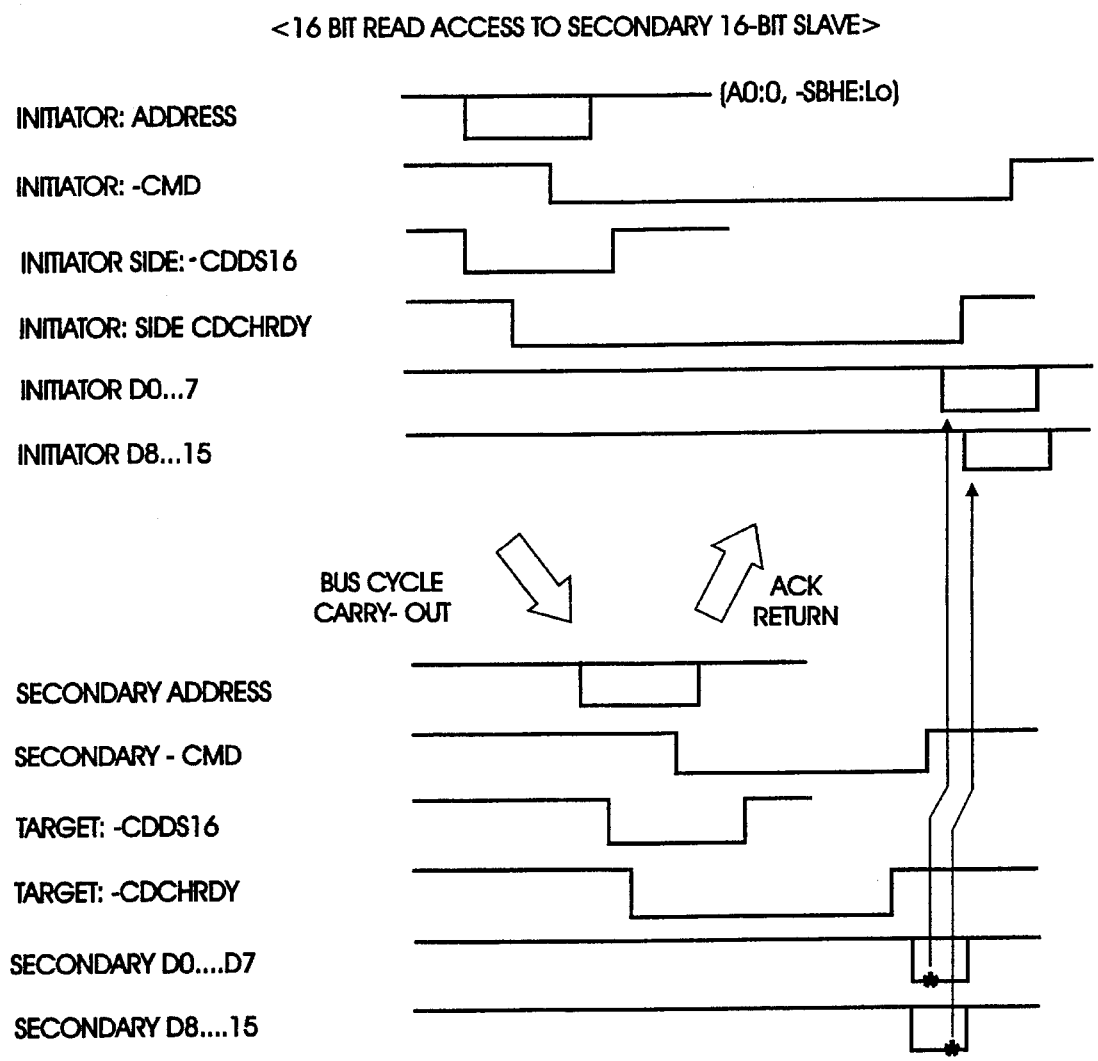
FIG. 14 is a diagram illustrating the operation of bus cycles.

FIGS. 13 and 14 show how the primary system gains 16-bit write and read access to the secondary system. In view of the fact that much of the operation of each individual functional block has been described so far, detailed explanations of those individual functional blocks are omitted here.

Packet data transmitter-receiver

The packet data transmitter-receiver 14 will be described packet data transmitter-receiver 14 has a packet prioritizer 22, a packet encoder 23, a serializer 24, a mark/space compensator 25, modulator 26, a decoder 27, a deserializer 28, a phase-locked-loop (PLL) 29, and a demodulator 30.

The packet prioritizer 22 requests the packet encoder 23 to generate packets in such a priority as shown in FIG. 15. The packet encoder 23 generates packets in response to a request for packet generation from the packet prioritizer 22. Each 10-bit packet field is fed into the serializer 24 through which they are to be output as a pair of 5-bit stream. Such pair of bit stream is fed into the modulator 26, from which one bit of each bit pair is sequentially output to the driver 27 for the electro-opto conversion assembly 5 at the falling edge of a clock pulse, and the other bit of each bit pair is similarly output to the driver 17 at the rising edge. The output from the modulator 26 is fed through the electro-opto conversion assembly 5 and the optical fiber assembly 2 to the secondary system.

The mark/space compensator 25 is provided to reduce the direct current of signals over a data line by use of a null data field for compensation. When there are excessive marks ('1's), a null data field including excessive spaces ('0's) is inserted, whereas a null data packet including excessive marks is inserted when there are excessive spaces.

Figure 16:
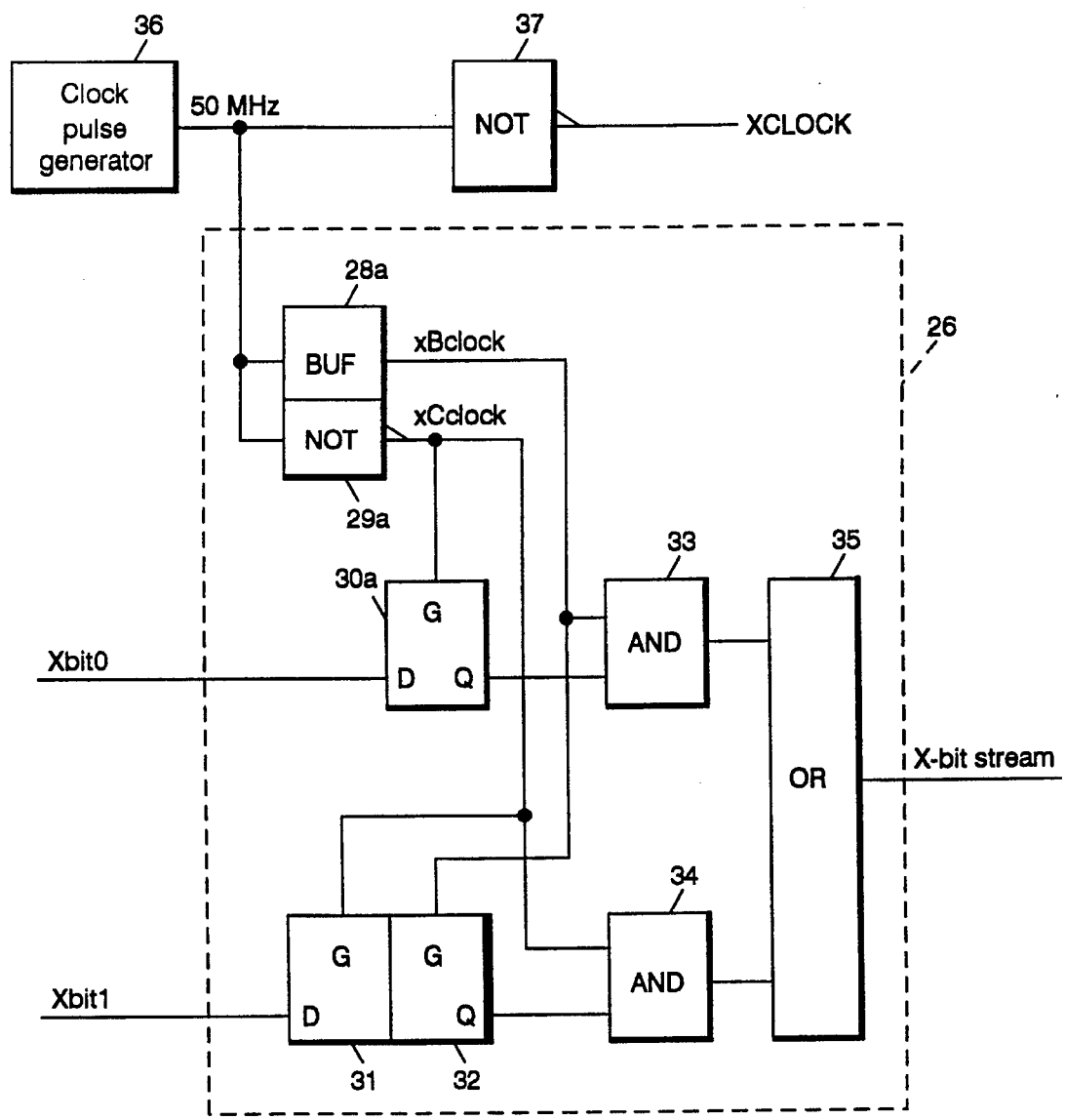
FIG. 16 is a circuit diagram showing the configuration of the modulator 26 shown in FIG. 5.
Figure 17:
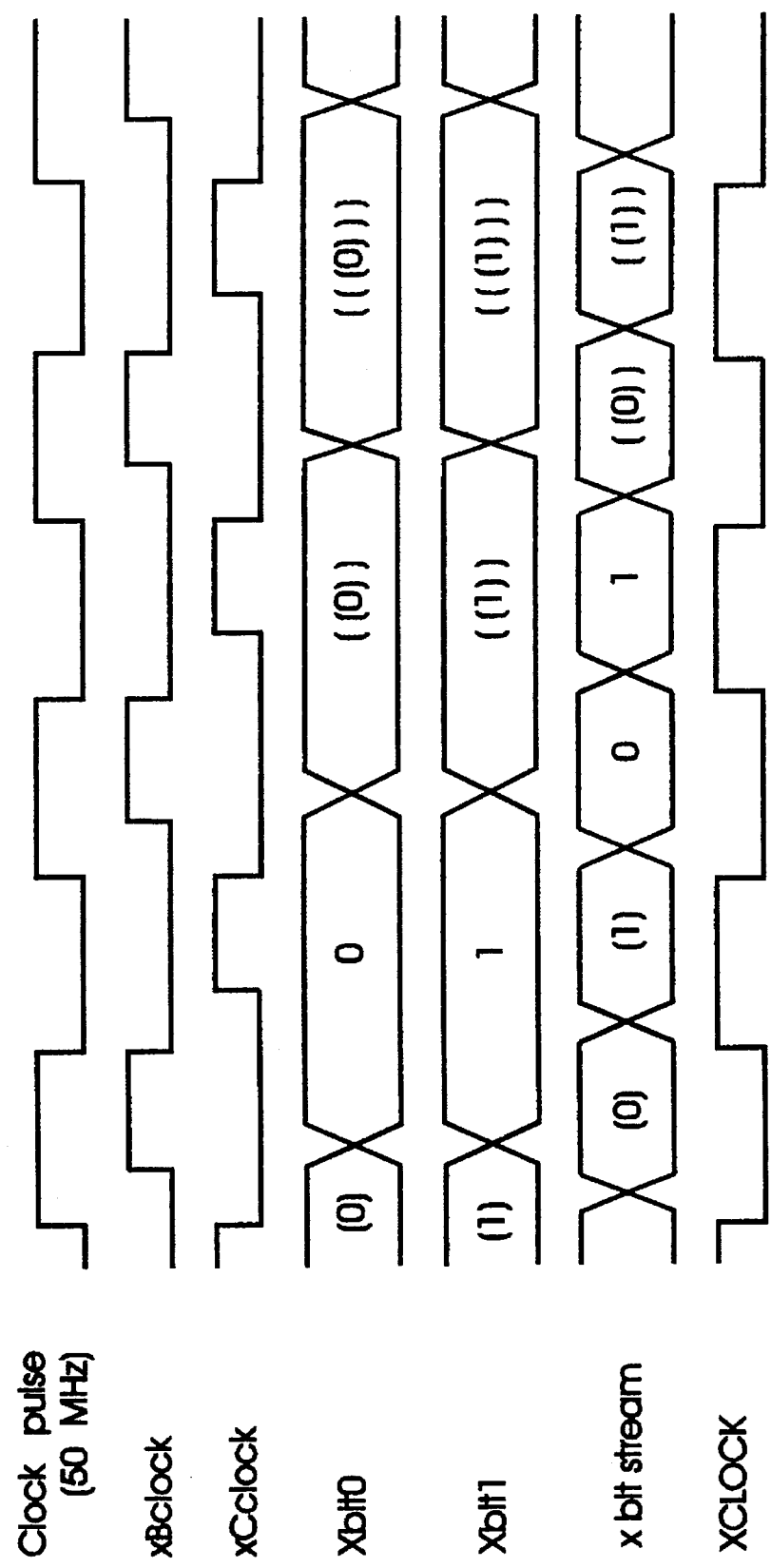
FIG. 17 is a timing chart of the operation of the modulator 26 shown in FIG. 5.

As shown in FIG. 16, the modulator 26 consists of a buffer 28a, an inverter 29a, latches 30a, 31, 32, AND circuits 33, 34, and an OR circuit 35. The modulator 26 is fed with clock pulses from the clock pulse generator 36 of the clock transmitter-receiver 16 along with a transfer bit pair, Xbit0 and Xbit1. These clock pulses are turned through the buffer 28a to XBclock pulses that control gates 31 and 32 and the AND circuit 34. These clock pulses are also turned through the inverter 29a to XCclock pulses that control the latch 30a and the AND circuit 34. The transfer bit pair, Xbit0 and Xbit1, are merged into an X bit stream which is then fed through the driver 27 to the electro-opto conversion assembly 5, as shown in FIG. 17. Clock pulses generated by the clock pulse generator 36 are turned through the inverter 37 to transfer clock XCLOCK pulses, which are then fed to the electro-opto conversion assembly 5 before being sent to the secondary system for demodulation of transmission signals. As apparent from FIG. 17, the bit rate of transfer data is set at twice that of those clock pulses. Accordingly, a relatively slow circuit is acceptable as the one relating to the clock generation.

Each bit stream from the secondary system is converted by the demodulator 30 into a stream of bit pairs and then converted by the deserializer 28 into a packet field, which is fed to the packet decoder 27. The PLL unit 29 is used to detect synchronization of a packet field and extract the packet field. The packet decoder 27 feeds the bus cycle receiver 21 of the bus cycle encoder/decoder 12 and the IRQ receiver 38 and MSC receiver 39 of the miscellaneous signal encoder/decoder 13 with control signals and data appropriate to each packet so that signals over the MicroChannel of the secondary system should be sent to the primary Micro-Channel bus 11.

Figure 18:
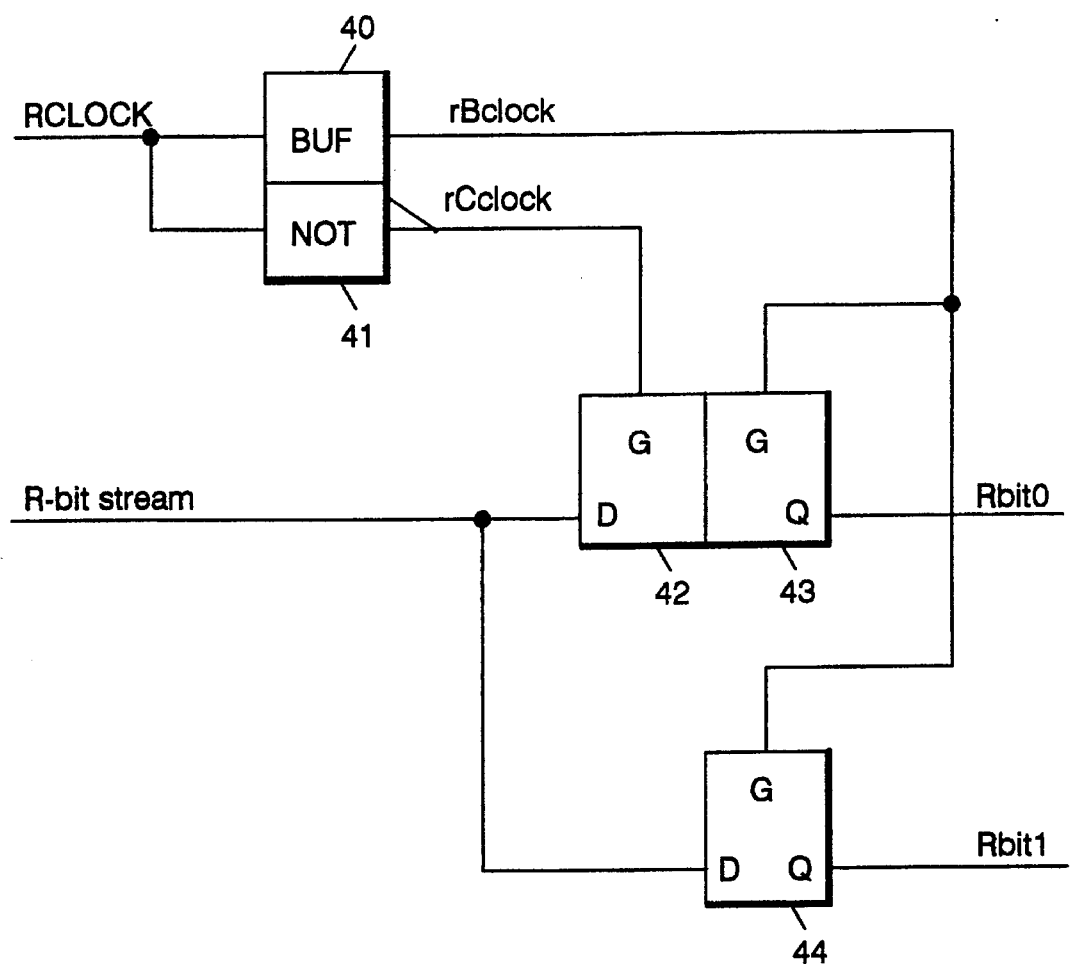
FIG. 18 is a circuit diagram showing the configuration of the demodulator 30 shown in FIG. 5.
Figure 19:
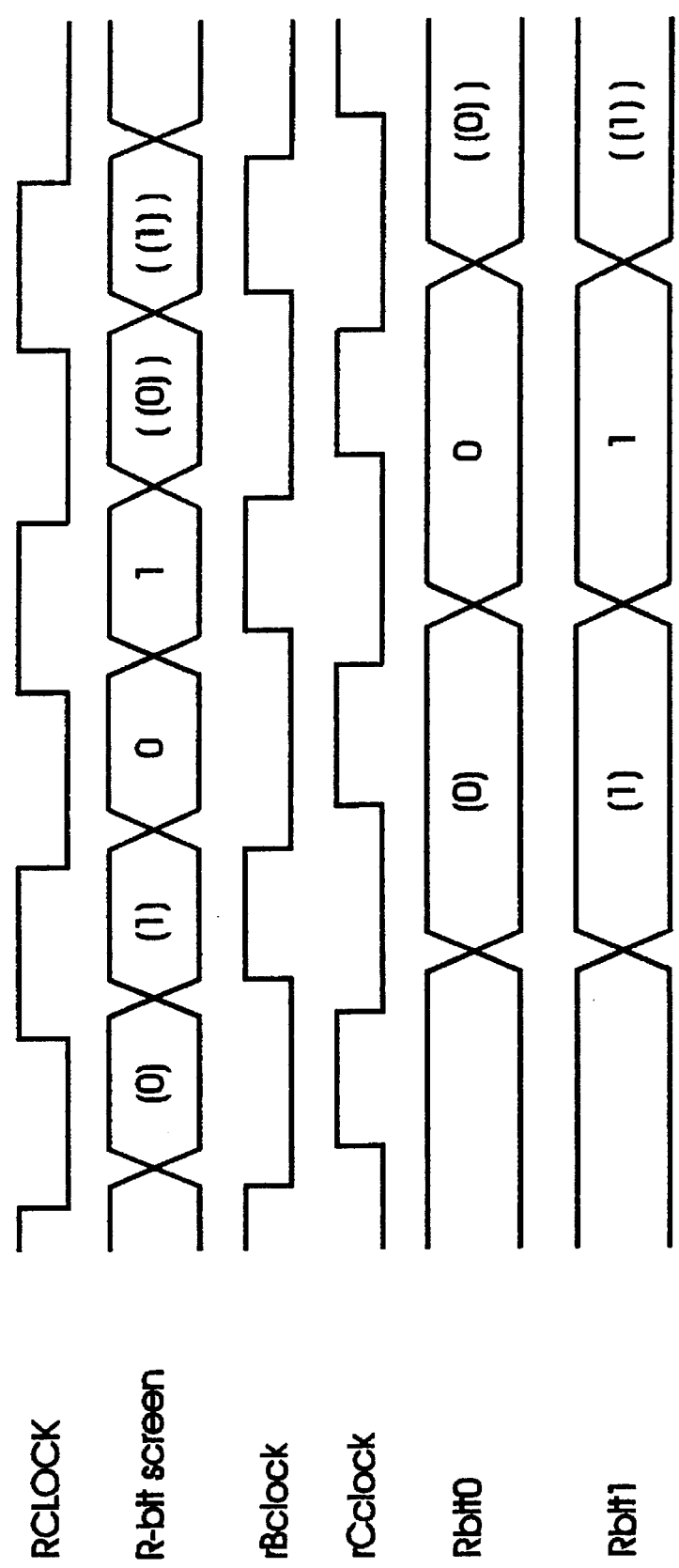
FIG. 19 is a timing chart of the operation of the demodulator 30 shown in FIG. 5.

As shown in FIG. 18, the demodulator 30 consists of a buffer 40, an inverter 41, and latches 42, 43, 44. As shown in FIG. 19, the demodulator 30 demodulates R bit streams sent from the primary system and streams of bit pairs from RCLOCK.

Miscellaneous signal encoder/decoder

The miscellaneous signal encoder/decoder is described in reference to FIG. 6 and the like.

In FIG. 6, the miscellaneous signal packet encoder/decoder 13, which processes the -IRQn, CHRESET, and -PREEMPT signals, consists of and IRQ processor 45 and an MSC (miscellaneous) processor 46.

IRQ processor

The IRQ processor 45 consists of an IRQ shadow register 46, an IRQ shadow-shadow register 47, an IRQ prioritizer 48, an IRQ transmitter 49, and an IRQ receiver 50.

To facilitate understanding, the -IRQn signal is described here. The "-IRQn" signal includes not only proper interrupt request signals, -IRQ3 to -IRQ7, -IRQ9 to -IRQ12, -IRQ14 and -IRQ15, but also the -CHCK signal for the sake of convenience. These signals are active-low wired-OR type signals driven by open-collector-type drive elements. For example, as shown in FIG. 20, when a particular peripheral device (an adapter) requests an interrupt for an MPU, the -IRQn line assigned to the peripheral device is driven to its low (low voltage level) state (A). A peripheral interrupt controller (PIC; not shown) then detects this signal, sends an interrupt request (-INT) to the MPU (B), and sets an in-service register (C). The MPU then executes a corresponding interrupt processing routine. On termination of the interrupt processing routine, the MPU makes notification of the end of interrupt (EOI) to the adapter of the peripheral device so that to drive the -IRQn line to its high (high voltage level) state (D). The MPU notifies of an EOI to the in-service register of peripheral interrupt controller so that to enable another -INT (E). The MPU then terminates the interrupt processing routine and proceeds to the next process (F).

To transmit the level of a -IRQn line between the primary system and the secondary system it is necessary to take account of the following factors: first, an echo causes the low level driving not to be released permanently. That is, when a -IRQn line is driven to its low state by a peripheral device in one system, the signal is transferred to the other system and the corresponding -IRQn line is driven to its low state by the IRQ processor, if the IRQ processor in the second system echos back the low state of the -IRQn line of the second system, the -IRQn line of the first system is driven low by the IRQ processor as well as the peripheral device, thus the -IRQn lines of both systems are driven low permanently even if the peripheral device receives an EQI (end of interrupt); second, a similar lock-up state results from peripheral devices of both systems driving the same -IRQn lines at almost the same time and the low-driven state being transferred to each other.

In this embodiment, a shadow register 46 is provided for each -IRQn line which represents the state of an -IRQn line of the secondary system. Moreover, when the shadow register indicates the low-driven state of the -IRQn line of the secondary system, no notification is sent to the secondary system even if a -IRQn line of the primary system is driven to its low state. The low-driven state thus not notified will be sent again later after drawing a comparison with the shadow-shadow register 47. This point will be described in detail later. By doing so, the notification of a low-driven state will not produce any echo, so that the problem of locking-up by an echo will be resolved.

To represent the level of a -IRQn line of the secondary system by the shadow register 46 of the primary system, it is necessary to send an IRQ packet from the secondary system to the primary system whenever the level of the -IRQn line of the secondary system is toggled.

A second problem is solved by a communication protocol. First, the secondary system returns a response packet to an IRQ packet sent from the primary system. If an IRQ packet is sent from the secondary system when a response packet is not yet received after an IRQ packet is sent from the primary system, it is regarded as simultaneous transmission of IRQ packets. In this case, one system (the personal computer 1, for example) toggles the shadow register in response the IRQ packet and sends a positive acknowledgement (ACK) to the other system. The other system (expansion box 3, for example) rejects the IRQ packet and sends a negative acknowledgement (NAK) to the one system. On the part of the other system, neither the shadow register nor its counterpart shadow-shadow register is toggled because the IRQ packet is rejected. Thus, the simultaneous high to low transition of the outputs of both shadow registers inverted by the inverters 57 is avoided, and thus the second problem is solved as well.

If the low-driven state of the primary system is not reflected in the secondary shadow register 46 on account of the denial as described above, notification to the secondary system of the low-driven state is again made by use of the primary shadow-shadow register 47. That is, the primary shadow-shadow register 47 is so designed that it will toggle in response to an ACK from the secondary system and maintain the state in response to an NAK. Consequently, the primary shadow-shadow register 47 operates as a mirror image of the secondary shadow register 46. Also, if no notification from the primary system to the secondary system has been rejected, the secondary shadow register 46 operates as a mirror image of the primary -IRQn line. Accordingly, if the state of the primary -IRQn line agrees with the state of the shadow-shadow register 47, the given notification has been accepted positively and therefore it is not necessary to send notification again.

By contrast, if the state of the primary -IRQn line is different from that of the primary shadow-shadow register 47, it is because the notification is rejected. In this case, the secondary system is again notified of the primary system's low-drive state after the primary shadow register 46 has recovered from the low-driving state.

Figure 21A:
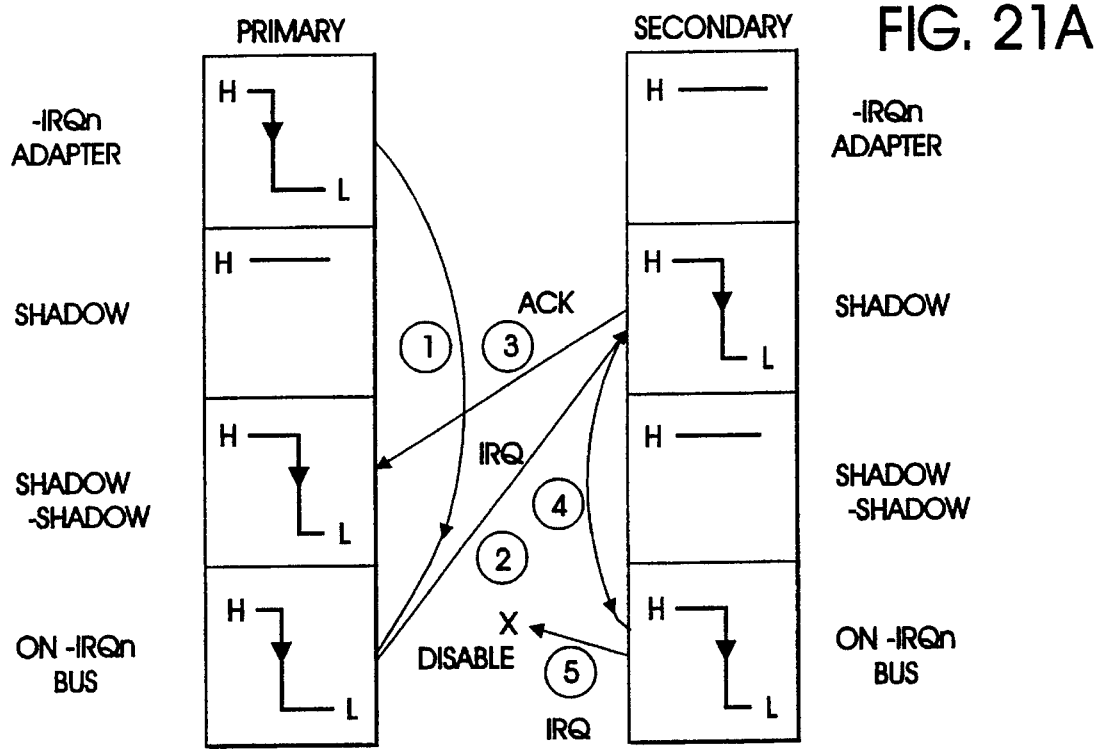
FIG. 21 is a diagram illustrating the operation of the IRQ processor 45.

FIG. 21A shows the operation of the -IRQn line in its high state at the outset being toggled to the low state only in the primary system. In FIG. 21A, as the level adapter of the -IRQn line is toggled from the high state to the low state, the wired-OR type -IRQn line goes low (1). Then an IRQ packet is sent from the primary system to the secondary system, so that the inverted output by inverter 57 of the secondary shadow register 46 is toggled from the high state to the low state (2). In response to this toggle, an ACK is returned from the secondary system to the primary system, so that the primary shadow-shadow register 47 is toggled from the high indication state to the low indication state (3). In this case, the secondary -IRQn line is similarly toggled to the low indication state as the inverted output by the inverter 57 of the secondary shadow register 46 has been toggled (4). However, in view of the fact that the inverted output by the inverter 57 of the secondary shadow register 46 is already low, no IRQ packet is sent to the primary system as the secondary -IRQn line is toggled to low state (5).

Figure 21B:
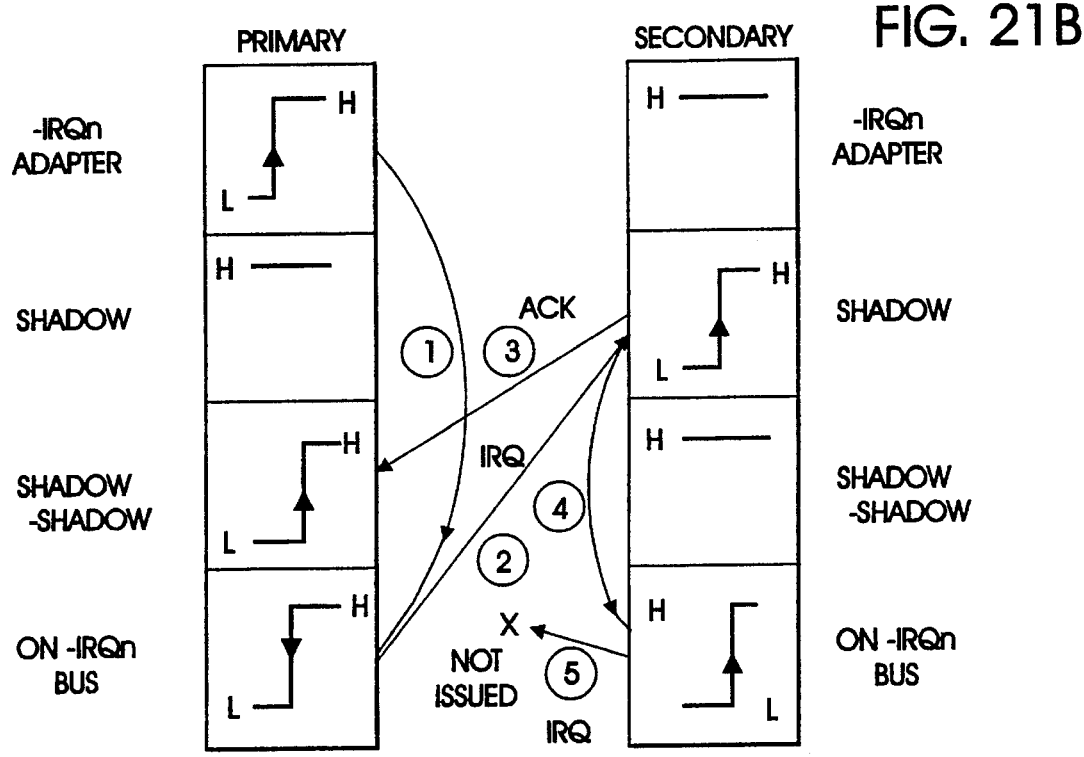

FIG. 21B shows the operation of the primary -IRQn line being returned from the state shown in FIG. 21A to the high state. In FIG. 21B, the wired-OR type -IRQn line goes high as the adapter toggles the -IRQn line from the low state to the high state (1). Then an IRQ packet is sent from the primary system to the secondary system (an IRQ packet is sent because the shadow-shadow register 47 still remains in its low indication state when the -IRQn line has gone high, or the secondary shadow register 46 does not yet represent the primary IRQn line.), so that the secondary register 46 is toggled from the low indication state to the high indication state (2). Then, in response to this toggle, the secondary system returns an ACK to the primary system, so that the primary shadow-shadow register 47 is toggled from the low indication state to the high indication state (3). In this case, the secondary -IRQn line also is turned from the low indication state to the high indication state in response to the toggle of the secondary shadow register 46 (4). However, since the secondary shadow-shadow register 47 also is in its high indication state, or the primary shadow register 46 is in the high indication state, no IRQ packet is sent to the primary system in response to the toggle of the secondary -IRQn line.

Figure 22A:
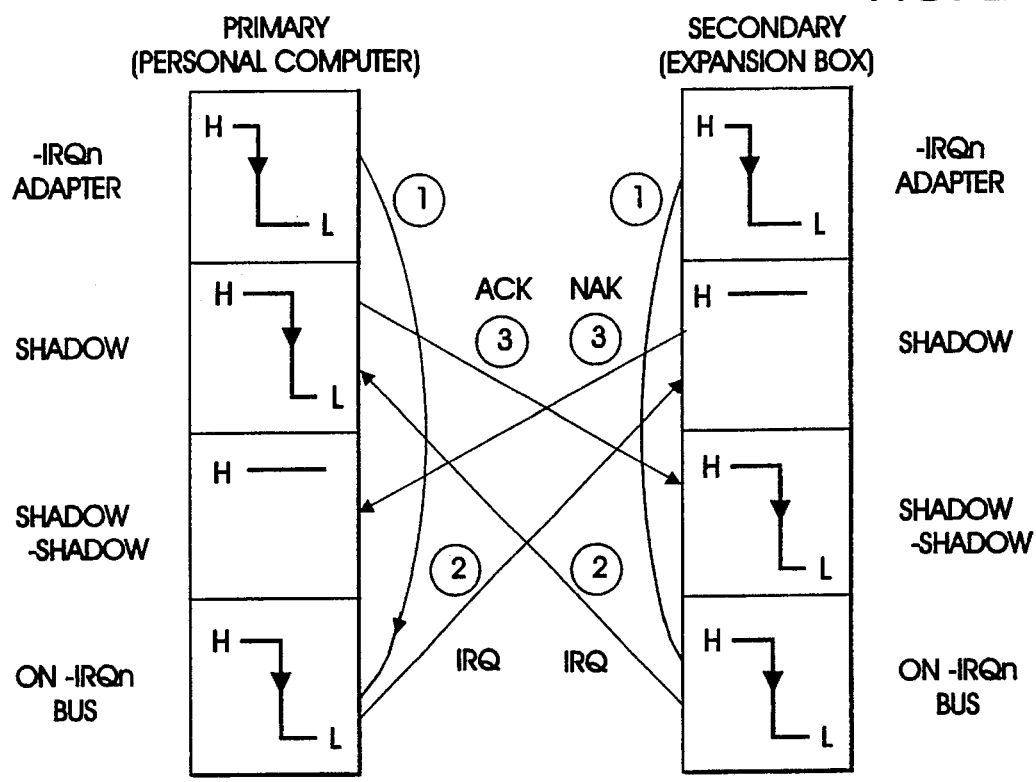
FIG. 22 is a diagram illustrating the operation of the IRQ processor 45.

FIG. 22A shows the operation of the -IRQn lines in both the primary and secondary systems being toggled from the high state to the low state at almost the same time. In FIG. 22A, as the adapters of the same -IRQn in both the primary system (a personal computer 1, for example) and the secondary system toggle the -IRQn lines from the high state to the low state, the wired-OR type -IRQn lines go low (1). Then IRQ packets are sent in a cross mode (2). Since, however, neither system has not yet received any ACK or NAK beforehand, the shadow register 46 in the expansion box 3 is not toggled, though the shadow register 46 is toggled in the personal computer 1 from the high indication state to the low indication state. Furthermore, an ACK is sent to the expansion box 3 in response to the toggle of the shadow register 46 in the personal computer 1, so that the shadow-shadow register 47 in the expansion box is toggled from the high indication state to the low indication state (3). On the other hand, since the shadow register 46 in the expansion box 3 remains in its high indication state without being toggled, an NAK is sent from the expansion box to the personal computer 1, so that the shadow register 47 in the personal computer 1 remains in its high indication state (3').

Figure 22B:
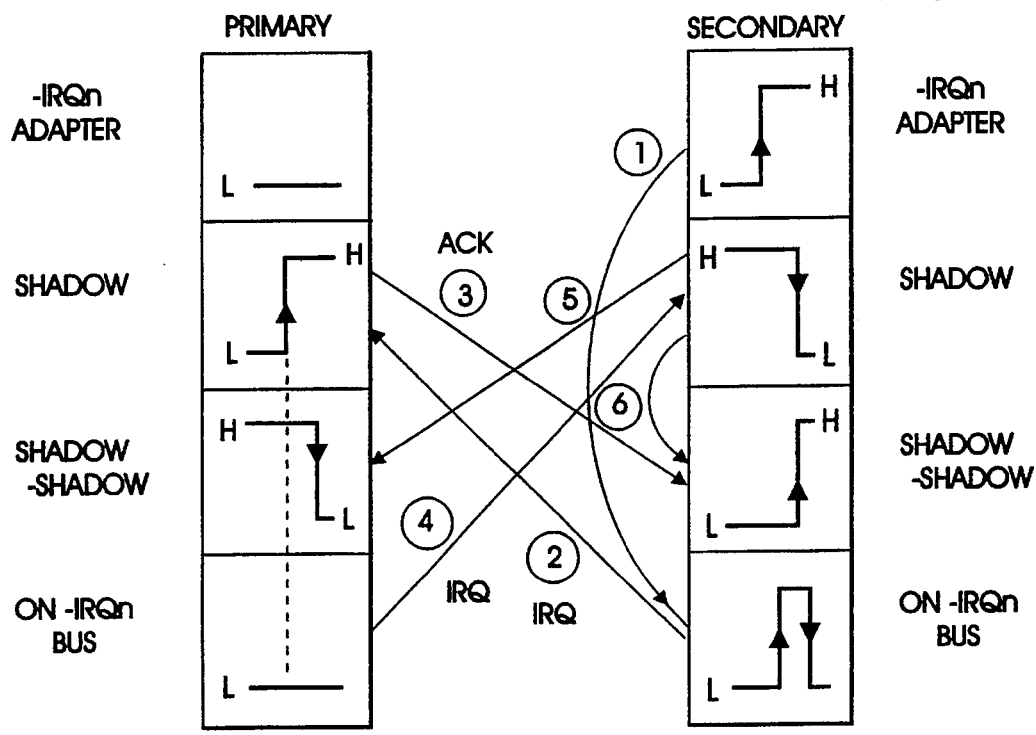

FIG. 22B shows the operation of the secondary -IRQn line returning to the high state. In FIG. 22B, the secondary -IRQn line is toggled from the low state to the high state as the secondary adapter toggles the -IRQn line from the low state to the high state (1). Since the secondary shadow-shadow register 47 is still in its low indication state at this point of time, and accordingly the primary shadow register is in its low indication state, an IRQ packet is sent from the secondary system to the primary system, so that the primary shadow register 46 is toggled to the high indication state (2). Correspondingly, an ACK is sent to the secondary system, so that the secondary shadow-shadow register 47 also is toggled to the high indication state (3).

Figure 23:
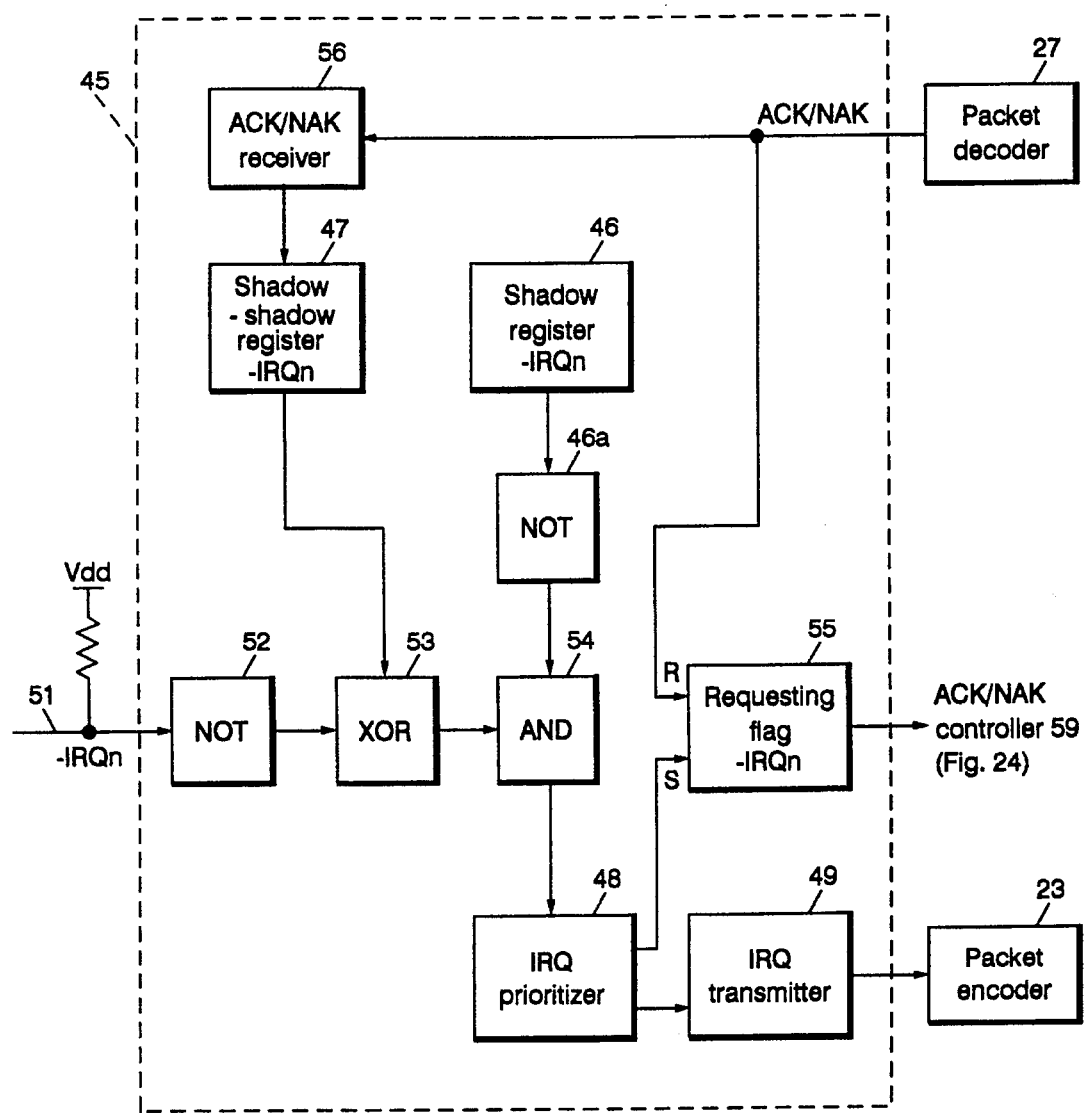
FIG. 23 is a block diagram of the detailed configuration of the IRQ processor 45.

On the other hand, considering the fact that the primary shadow resister 46 goes to the high indication state, the secondary system is again notified of the low state of the primary -IRQn line. That is, since the primary system is ready to send an IRQ packet and the primary -IRQn line is low state and the shadow-shadow register 47 is in its high indication state at this point of time, and an IRQ packet is transferred from the primary system to the secondary system, and correspondingly the secondary shadow register 46 is toggled to the low indication state (4). An ACK is returned from the secondary system to the primary system, so that the primary shadow-shadow register 47 is toggled to the low indication state (5). On the part of the secondary system, the shadow register 46 is toggled to the low indication state, so that the -IRQn line as well is toggled to the low state again (6). FIG. 23 shows the detailed configuration of the signal transmitter of the IRQ processor 45. In FIG. 23, signals on the -IRQn line 51 of the primary MicroChannel bus 11 are sampled and then fed through the inverter 52 to the XOR (exclusive OR) comparator 53. The other input of the comparator 53 is fed with the output from the shadow-shadow register 47. The shadow-shadow register 47 is toggled in response to an ACK from the secondary system. The output of the comparator 53 is fed to the AND circuit 54. The other input of the AND circuit 54 is fed with the output of the shadow register 46 through the inverter 46a. The output of the AND circuit 54 is fed through the IRQ prioritizer 49 and the IRQ packet transmitter 49 to the packet encoder 23 (FIG. 5) of the packet data transmitter-receiver 14. The IRQ prioritizer 48 gives top priority to the -CHCK signal and the rest is determined according to interruption levels. The requesting flag 55 is set in response to the transmission of an IRQ packet, and is reset in response to the reception of an ACK or NAK from the secondary system. This flag is used to resolve the above-described lock-up state when IRQ packets arrive at the primary and secondary systems at the same time. Also, the receiver 56 is an ACK/NAK receiver.

Suppose in such a configuration as the above that the -IRQn line 51 is toggled from the high (high voltage level) state to the low (low voltage level) state. Then the output of the inverter 52 will be set at 1. On this occasion, it is presupposed that the negation state (0, or the high indication state) set previously is reflected in the secondary shadow register 46, and hence the primary shadow-shadow register 47 is set to 0 (high indication state). Then the output of the comparator 53 is set to 1. If the shadow register 46 is set to 0 (high indication state), the output of the AND circuit 54 also is set to 1, so that a request to send a packet is made from the IRQ prioritizer 48 and then the packet encoder 23 sends an IRQ packet according to its priority.

On the other hand, if the shadow register 46 is set to 1 (the low indication state), or the secondary -IRQn line is asserted, the output of the AND circuit 54 is always 0 because one input of the AND circuit 54 is 0. For this reason, the sending of an IRQ packet is inhibited even if the primary -IRQn line 51 is asserted. When the secondary -IRQn line is then negated, an IRQ packet is sent from the secondary system and the primary shadow register 46 is toggled to 0 (high indication state), consequently an IRQ packet is sent to the secondary system in response to the assertion of the primary -IRQn line 51.

Figure 24:
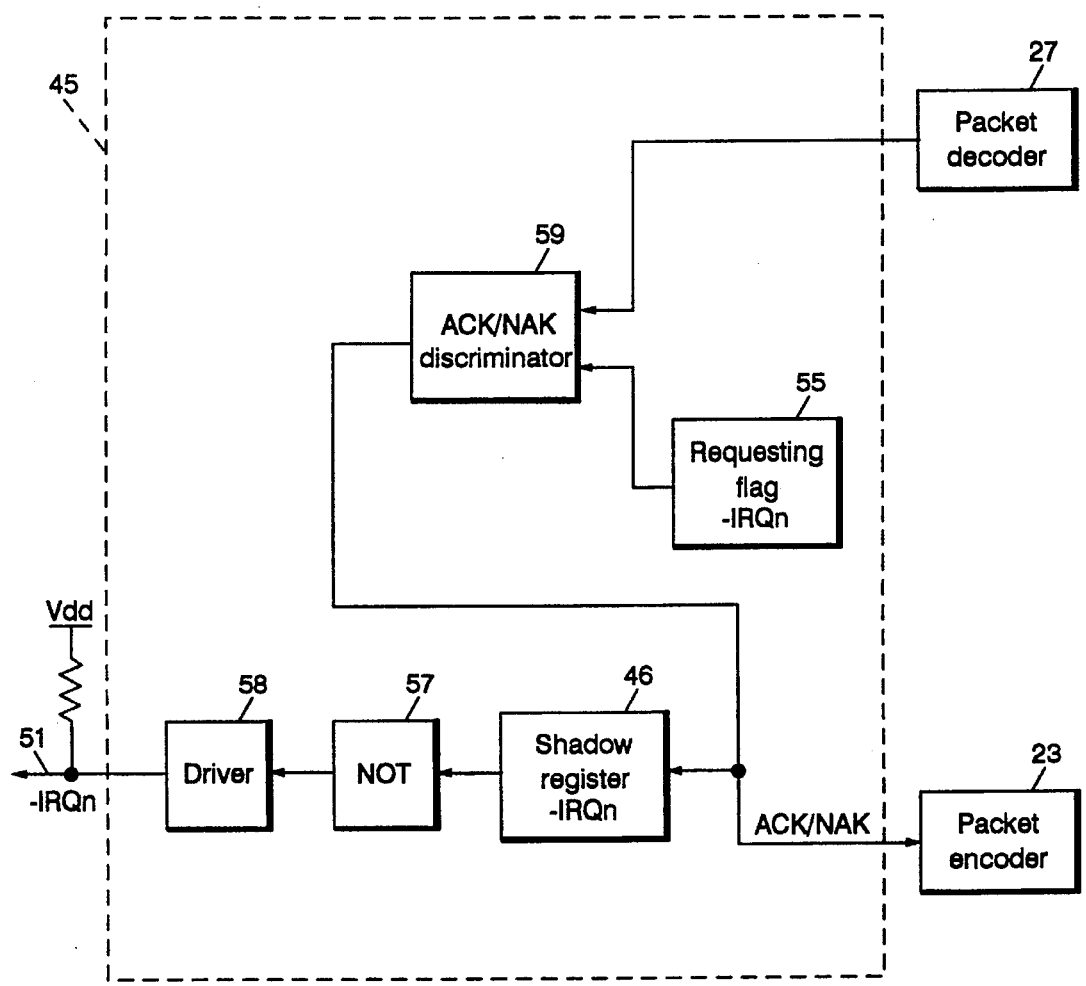
FIG. 24 is a block diagram of the detailed configuration of the IRQ processor 45.

FIG. 24 shows the detailed configuration of the signal receiver of the IRQ processor 45. In FIG. 24, the output of the shadow register 46 is fed through the inverter 57 to the open-drain driver element 58. The decoded output from the packet decoder 27 (FIG. 5) is fed to the ACK/NAK discriminator 59. The ACK/NAK discriminator 59 selects either rejection or assertion by reference to the requesting flag 55. If the requesting flag 55 indicates "requesting", rejection is validated only on the part of the expansion box 3 without the shadow register 46 being toggled, and an NAK packet is returned to the secondary system through the packet encoder 23. Otherwise, assertion is determined and an ACK packet is returned to the secondary system.

In such a configuration as the above, the shadow register 46 is toggled to toggle the IRQn line to assertion or negation in response to an IRQ packet sent from the secondary system unless the primary requesting flag 55 indicates a requesting state.

Now let us consider cases such that the -IRQn lines 51 in both the primary and secondary systems are toggled at the same time. Among such cases, it is only where both IRQn lines are toggled from negation to assertion that both systems send IRQ packets to each other, because the transfer of an IRQ packet from one system is inhibited by the shadow register 46 if the other has already been asserted. If IRQ packets have been sent from both systems at almost the same time, either system will receive the IRQ packet from the counterpart before an ACK or NAK (of the IRQ packet) from either of the two systems has been sent. On the part of the personal computer 1, a decision on consent is made and the shadow register 46 is toggled from 0 to 1. At the same time, an ACK packet is transferred to the expansion box 3, so that the shadow-shadow register 47 in the expansion box 3 is toggled from 0 to 1. On the other hand, the decision is made to reject the IRQ packet sent to the expansion box 3, with the shadow register 1 of the expansion box 3 remaining 0. Also, an NAK packet is sent to the personal computer 1, the shadow-shadow register 47 of the personal computer 1 remaining at 0. Thus, the above-mentioned lockup state caused when the -IRQn lines 51 are toggled at the same time is resolved. Again, if the -IRQn line 51 in the expansion box 3 is negated, it is allowed to transfer an IRQ packet from the personal computer 1.

If the expansion box 3 responds with an NAK and the personal computer 1 responds with an ACK, the -IRQn signal from the expansion box 3 is facilitated for transmission to the personal computer 1, but not vice versa. Since, usually, a peripheral interrupt controller is considered to be provided on the personal computer 1, it is effective to do so. If there is a peripheral interrupt controller in the expansion box 3, it is preferable to reverse the asymmetry.

MSC processor

The MSC processor 46 is described. In FIG. 6, the MSC processor 46 consists of a CHRESET shadow register 60, a CHRESET shadow-shadow register 61, a -PREEMPT shadow register 62, a -PREEMPT suppressor 63, an EOT state detector 64, a central arbitration control point (CACP) controller 65, an MSC transmitter 66, and an MSC receiver 67.

The CHRESET shadow register 60 and the shadow-shadow register 61 are similar to the shadow register 46 and shadow-shadow register 47 of the IRQ processor 45, respectively, and are provided to transfer the CHRESET signal from the personal computer 1 to the expansion box 3. The operation of these registers will not be detailed here, because it is almost the same as that of the IRQ processor 45.

Figure 25:
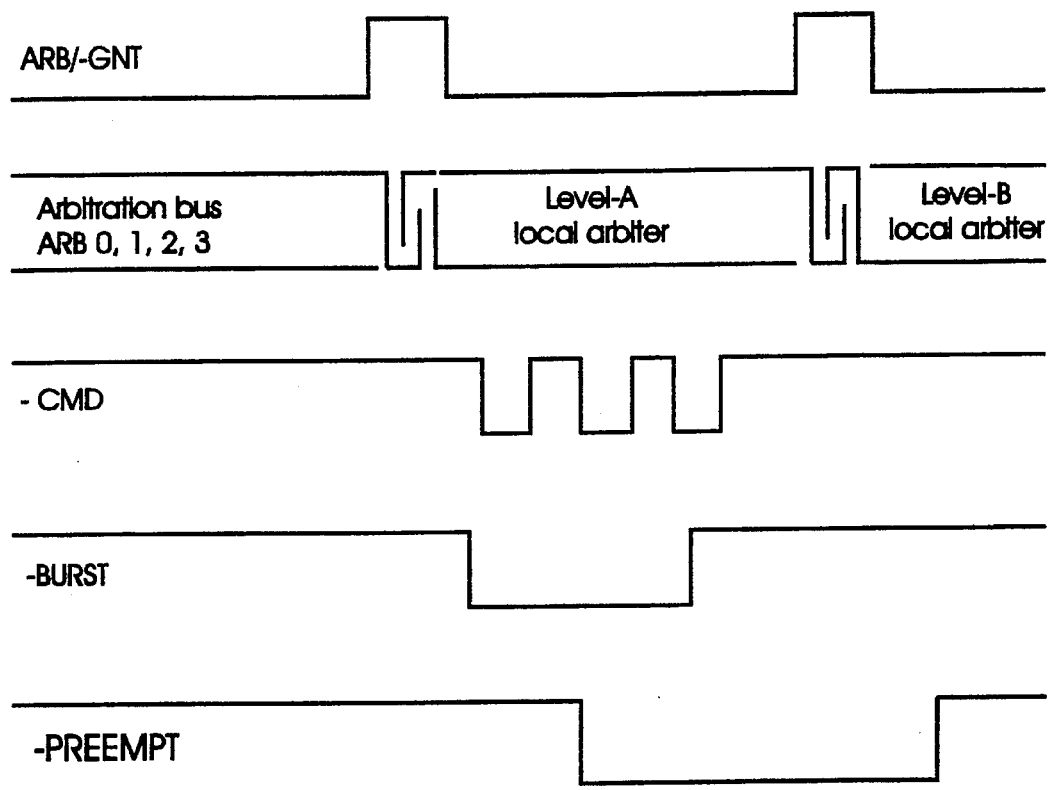
FIG. 25 is a timing chart showing the outline of arbitration.

The -PREEMPT shadow register 62 and the suppressor 63 are provided to send/receive the -PREEMPT signal. A brief explanation of the -PREEMPT signal will be given below. FIG. 25 shows the operation of one device requesting the right for bus service from another device in its burst transfer mode. In FIG. 25, arbitration is conducted on the arbitration bus when the ARB/-GNT is high. An arbiter as a winner in arbitration drives the -BURST to the low state to hold the bus for burst transfer. When another device is to use the bus, it drives the -PREEMPT to the low state in order to notify the device holding the bus. The device holding the bus releases the -BURST to the high state to bring about an EOT state in response to the low level of the -PREEMPT. The CACP detects the EOT state and sets the ARB/-GNT to the high state to start arbitration. A device as a winner in the arbitration releases the -PREEMPT to high state when ARB/-GNT goes low.

Figure 26:
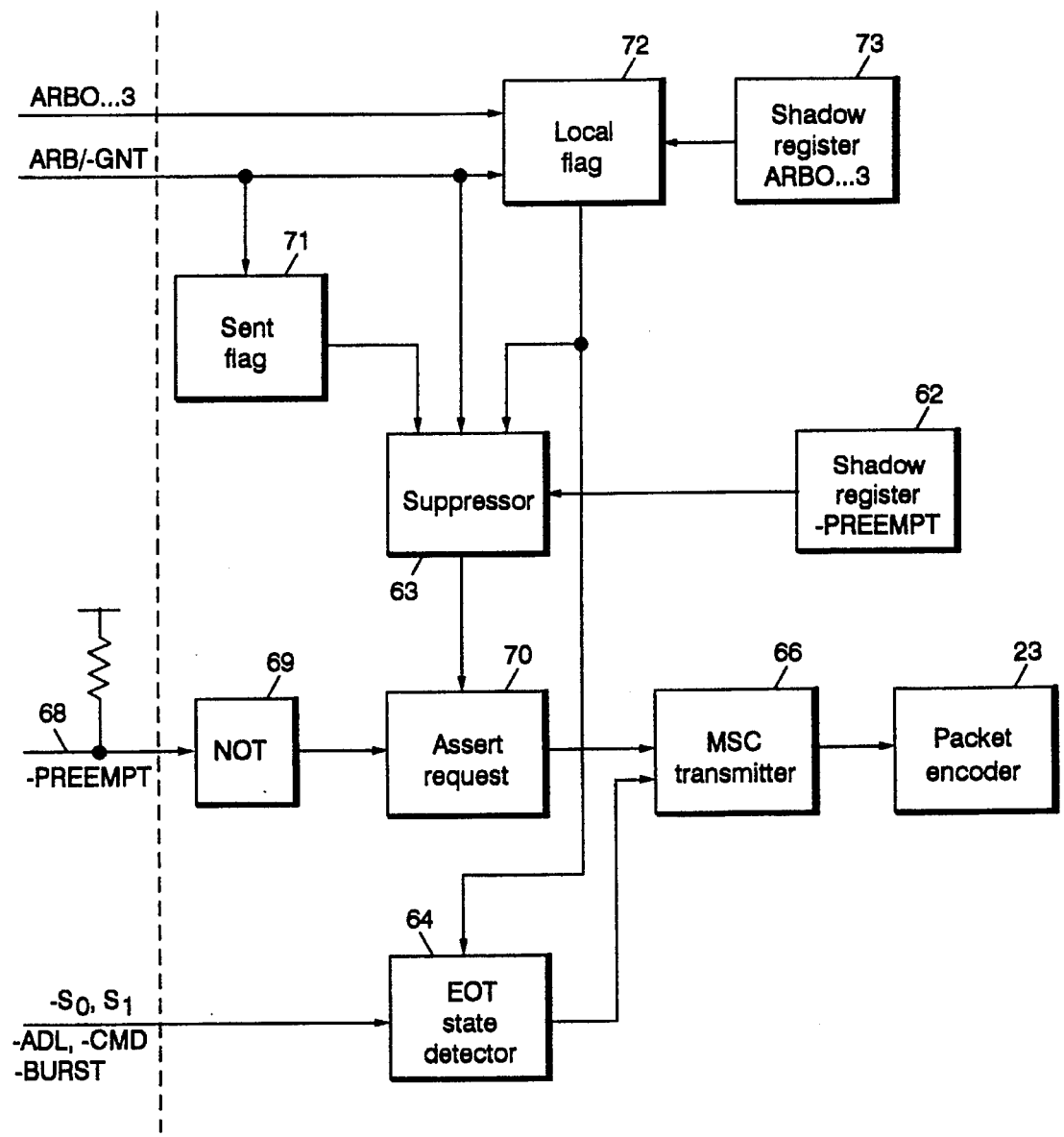
FIG. 26 is a block diagram of the detailed configuration of the MSC processor 46.

FIG. 26 shows the shadow register 62, the suppressor 63, and other -PREEMPT signal transmission related components. In FIG. 26, the -PREEMPT line 68 of the primary MicroChannel bus 11 is always sampled. If this line 68 is driven, or if a bus master requests the current bus holder to release the bus, a low-level signal is fed through the inverter 69 to the PREEMPT assert requester 70. In response to the signal, the assert requester 70 controls the MSC transmitter 66 to send a packet for asserting the -PREEMPT signal from the encoder 23 unless a restraining signal is issued from the suppressor 63.

The suppressor 63 is so designed as to inhibit the transmission of a packet notifying the assertion of the -PREEMPT signal by receiving the sent flag 71, the bus holder's local flag 72, the contents of the -PREEMPT shadow register 62, and the ARB/-GNT signal. The bus holder's local flag 72 indicates in which system the current bus holder is present, and its content is determined by comparing the level of the primary arbitration signals at the end of bus arbitration (when the ARB/-GNT is low) with the level of the arbitration shadow register 73 (indicating the level of the secondary arbitration signals). For instance, if the level of the primary arbitration signal is higher than that of the arbitration shadow register, the primary bus master becomes a bus holder, so the '1' (local) is set. Otherwise, '0' (remote) is set. When the bus holder is present in the primary system, the assert requester 70 is inhibited to operate because it is unnecessary to send any -PREEMPT signal to the secondary system.

Also when the ARB/-GNT signal is high, or arbitration is being conducted, the assert requester 70 is inhibited from operation. Again, the "transferred" flag 71 indicates that a PREEMPT packet has already been sent, in which case also the operation of the assert requester 70 is inhibited. Moreover, the shadow register 62 indicates that the -PREEMPT line in the secondary system is being asserted, in which case the operation of the assert requester 70 is also inhibited to avoid lock-up due to echoes.

The EOT detector 64 detects the absence of the signals, -S0, -S1, -ADL, -CMD, -BURST and thus detects the end of a bus cycle (an EOT state). The MSC packet transmitter 66 is notified of the EOT state thus detected and notification is then sent as an EOT packet from the packet encoder 23 to the secondary system.

Figure 27:
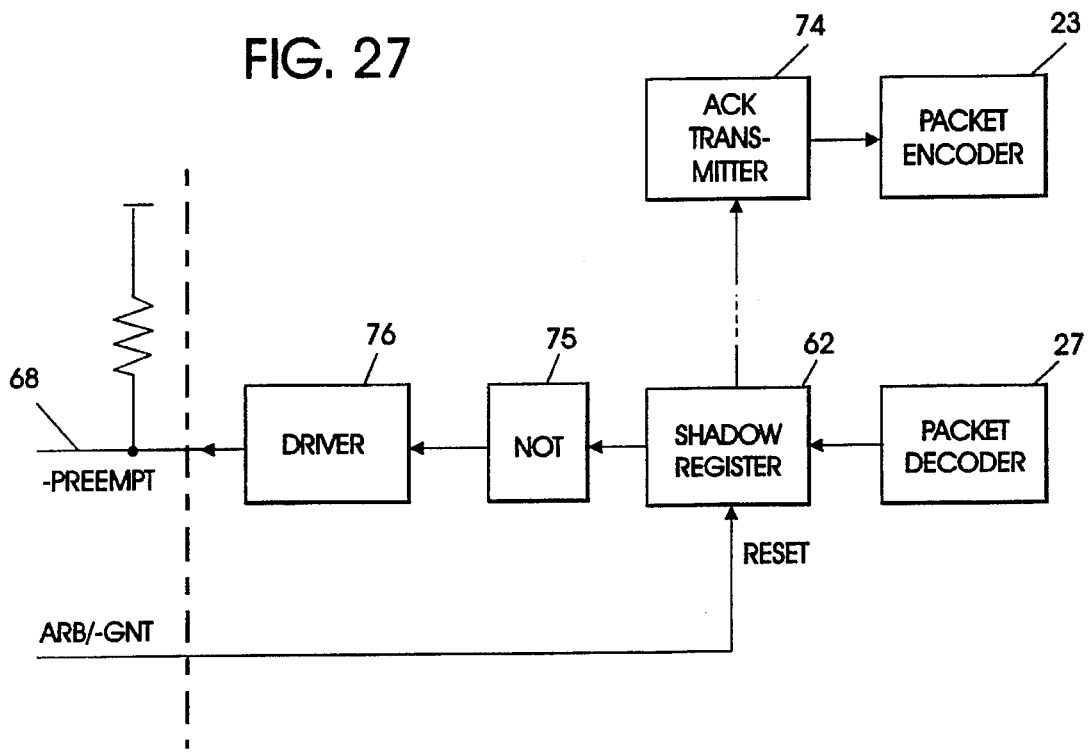
FIG. 27 is a block diagram of the detailed configuration of the MSC processor 46.

FIG. 27 shows the configuration of the -PREEMPT signal receiver. In FIG. 27, if notification of the assertion of the secondary -PREEMPT signal is made through the packet decoder 27, the shadow register 62 is toggled and the ACK transmitter 74 requests the packet encoder 23 to make notification of an ACK packet. The output of the shadow register 62 is fed through the inverter 75 to the open-drain driver element 76 to drive the -PREEMPT line 68. The shadow register 62 is reset when the ARB/-GNT signal rises, or when arbitration is started after the bus is released, so that the register 62 is driven to the high state.

Figure 28:
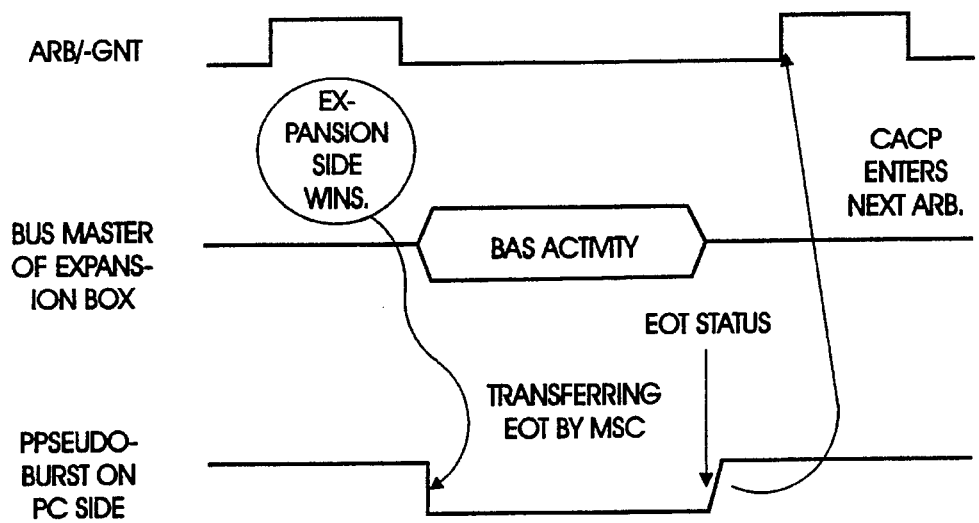
FIG. 28 is a timing chart of the operation of the SMC processor 46.

The EOT state detector 64 and the CACP controller 65 are described. As has been explained above in reference to FIG. 25, a central arbitration control point (CACP) is established to drive the ARB/-GNT signal to its low state normally, and to drive it to the high state to start arbitration only when an EOT state is detected. Such CACP is provided only in one system, e.g., the personal computer 1. If the bus master, etc., of the expansion box 3 holds the bus, it is necessary to prevent the CACP on the personal computer 1 from initiating arbitration. In this embodiment, the CACP controller 65 of the personal computer 1 judges that the bus master of the expansion box 3 has caught hold of the bus, and generates a pseudo -BURST signal. On the part of the expansion box 3, the EOT detector 64 of the expansion box detects an end of bus activity and makes notification of an EOT to the CACP controller 65 of the personal computer 1 to terminate pseudo -BURST and thus enables new arbitration to start. FIG. 28 shows the above aspects.

The operation of the miscellaneous packet encoder/decoder 13 is as detailed above. Again, the related encoding and decoding of packets are conducted by the packet data transmitter-receiver 14, in a fashion similarly to the processing of bus-cycle-related signals.

Non-packet data transmitter-receiver

The non-packet data transmitter-receiver 15 is described with reference to FIG. 6. The non-packet data transmitter-receiver 15 samples instantaneous values of signals and directly transmits the values thus sampled. In such a transmission mode, delay attendant to the transmission and the reception of packets can be restrained and therefore this transmission mode is effective for signals that allow no timing delay. In this embodiment, the non-packet data transmitter-receiver 15 handles the arbitration related signals, ARB/-GNT and ARBn and the DMA controller related signals, -BURST and -TC.

Remote arbiter

Figure 29:
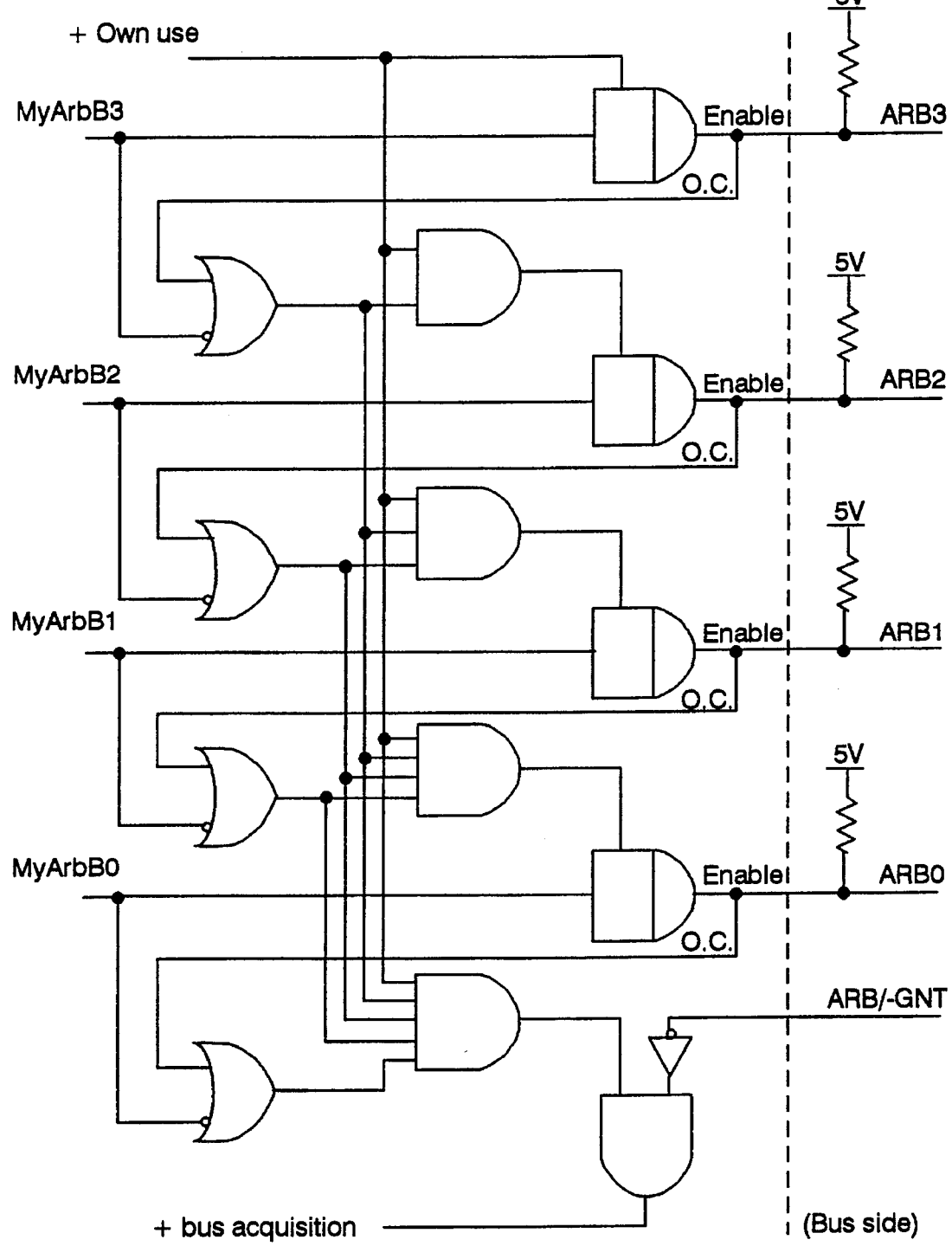
FIG. 29 is a circuit diagram showing the configuration of a local arbiter.

The remote arbiter 77 is now described. For ease of understanding, a brief explanation of arbitration of the MicroChannel bus is provided below. According to MicroChannel architecture, bus masters and DMA slaves (such as a peripheral device using a DMA controller) are requested to be equipped with local arbiters for distributed arbitration under CACP control. The CACP controller notifies each local arbiter that arbitration is started by driving the ARB/-GNT signal to the high state in response to an EOT state. FIG. 29 shows the configuration of each local arbiter, where each ARBn line is wired-ORed to each corresponding ARBn line of the MicroChannel bus. As arbitration starts, each local arbiter outputs its own arbitration level, ARBn, to the ARBn line of the MicroChannel bus. Then comparison of each ARBn signal of each local arbiter with the signal of ARBn line of the MicroChannel bus (the logical sum of negative logic of each arbiter's ARBn) is drawn from the high-order bit (ARB3). If a local arbiter's bit is inferior, the output of its subsequent low-order bits is disabled. As a result, the ARBn of the MicroChannel also changes, so that finally, the ARBn of the local arbiter whose priority is highest is generated on the ARBn line of the MicroChannel bus and thus a certain local arbiter whose bits are all equal to those of the MicroChannel bus issues a "survival" signal. If a "survival" signal is issued after the arbitration ends, or the ARB/-GNT signal goes low, it is because the local arbiter has won in the arbitration.

FIG. 30 shows an example of conventional arbitration. As shown in FIG. 30, arbitration is conducted in four phases. In phase 1, the arbitration level of the previous winner is turned off to restore the ARBn lines (Toff+Trc; Toff is the operational delay of the drive element; a delay, Trc, occurs at the rising edge of the ARBn line because of distributed capacitance and pull-up resistance). In phase 2, the current arbiter's arbitration level is output through an open-collector-type driver element (Ton). In phase 3, the OR circuit determines whether the arbiter's own level is inferior to that of the ARBn line, and if inferior, the driver element is turned off to restore the ARBn line (Toff+Trc). Finally, in phase 4, specified open-collector-type driver elements are turned on in response to a change of the ARBn lines.

Phase 1: If we focus our attention on arbiter A, the following sequence results: first, inasmuch as the previous winner's level, or the level of the current ARBn line, ARB3, 2,1,0, is (0, 0, 0, 0), the output of the OR circuit is set to 0 by the '0' input of the ARB3 line and the inverted input of the arbiter's level, ARB3, so that a certain driver element corresponding to ARB2, 1, 0 is disabled and thus the output of the driver elements has high impedance, Z. Correspondingly, the local arbiter outputs (1, Z, Z, Z) to the ARBn line. The output '1' of the open-collector-type driver element corresponds to high impedance, in which case this state is represented by '1'. On the other hand, the case where the output of the driver element assumes high impedance on account of the driver element being disabled is represented by 'Z'. Similarly, other arbiters also produce such output as shown in FIG. 30. Thus, the level of the ARBn line rises from (0, 0, 0, 0) to (1, 1, 1, 1) with a delay due to the distributed capacitance and pull-up resistance of the ARBn lines.

The following lists the truth table of the OR circuit as a reference:

| MyArbBn | ARBn line level | OR circuit output | Subsequent phase enable/disable |
|---------|-----------------|-------------------|-------------------------------|
| 0 | 0 | 1 | Enable |
| 0 | 1 | 1 | Enable |
| 1 | 0 | 0 | Disable |
| 1 | 1 | 1 | Enable |

Phase 2: Each local arbiter outputs its own level to the ARBn line. The ARBn line is of negative-logic wired-OR connection and therefore takes (1, 0, 0, 0), though it is an AND circuit from a positive-logical point of view because its "high" state corresponds to '1' for ease of explanation.

Phase 3: If we focus our attention on arbiter A, the following sequence will result: first, to the degree that the current ARBn line levels, i.e., ARB3, 2, 1, 0, are (1, 0, 0, 0), the outputs of the OR circuits corresponding to ARB3 and ARB2 are both '1,' so that ARB3 and ARB 2 do not disable the subsequent phases, but output '1' and '0' respectively. On the other hand, the output of ARB1 is '1' and the level of the ARB1 line is '0,' and therefore, as evident from the above-mentioned truth table, the output of the OR circuit becomes '0,' so that ARB1 outputs '1' while disabling the subsequent phases. Thus the local arbiter outputs (1, 0, 1, Z) to the ARBn line. Similarly, other arbiters also produce such output as shown in FIG. 30. Consequently, the level of the ARBn lines is turned from (1, 0, 0, 0) to (1, 0, 1, 1) with a delay due to the distributed capacitance and pull-up resistance of the ARBn lines.

Phase 4: Focus attention on arbiter A. As the level of the ARBn line becomes (1, 0, 1, 1) in phase 3, the output of the OR circuit corresponding to ARB1 which remained '0' until then is turned to '1,' so that the local arbiter outputs (1, 0, 1, 0). Similarly, the outputs of other local arbiters as well are as shown in FIG. 30. Yet, none other than arbiter A becomes a winner as long as Z is included in the output. Thus, the level of the ARBn line as well becomes (1, 0, 1, 0).

The arbitration explained above is not properly conducted if two systems are linked together with an optical fiber assembly 2, as in this embodiment. To resolve this difficulty, arbitration is conducted in two phases in this embodiment. First, both systems conduct the first arbitration. Then the arbitration level of a winner in the arbitration is sent to the remote arbiter 77 of the other system to represent the winner. The remote arbiter 77 has an arbitration controller 79 which possesses the above-mentioned local arbiter functions and a shadow register 73 representing the arbitration level of the counterpart winner. Once the shadow register 73 of each remote arbiter 77 holds the arbitration level of the counterpart winner at the end of the first arbitration, the second arbitration is then conducted. The second arbitration is conducted between the winner in each system and the winner in the other system, or the shadow register. Thus, the actual equipment of either system and its corresponding arbiter 77 of the other system survive the arbitration. Yet, it is only the actual equipment that starts an actual bus cycle.

In view of the fact that arbitration is thus conducted in two phases, the period of time required for arbitration is lengthened with a software switch.

Figure 31:
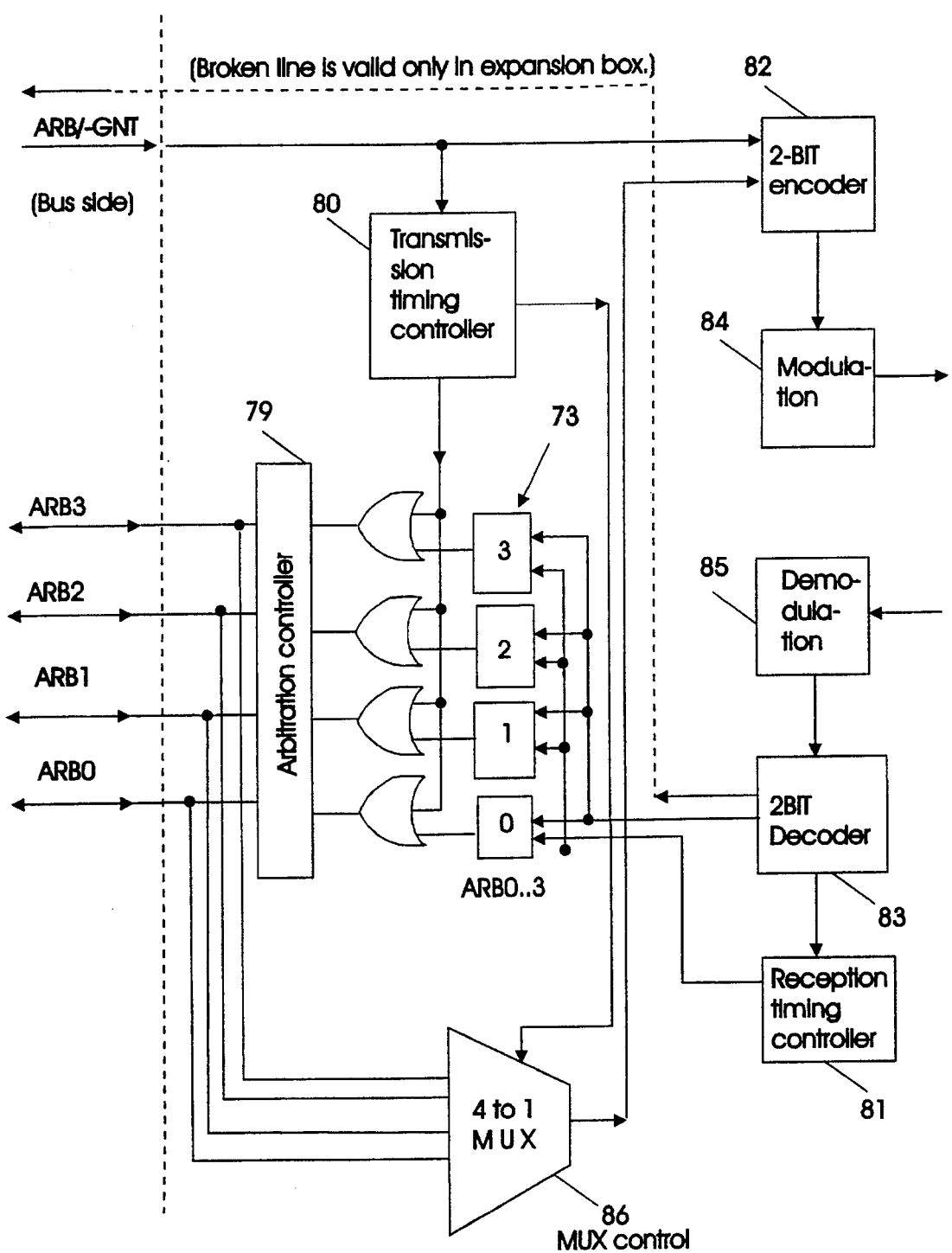
FIG. 31 is a block diagram of the configuration of the remote arbiter 77 shown in FIG. 6.

FIG. 31 shows the configuration of the remote arbiter 77. In FIG. 33, the remote arbiter 77 includes an arbitration controller 79, shadow register 73 for remote ARBn, transmission timing controller 80, reception timing controller 81, 2-bit encoder 82, and a 2-bit decoder 83. Again, the modulator 84 has a configuration similar to the modulator 26 of the packet data transmitter-receiver 14. The demodulator 85, on the other hand, is configured similarly to the demodulator 30 of the packet data transmitter-receiver 14.

Figure 32:
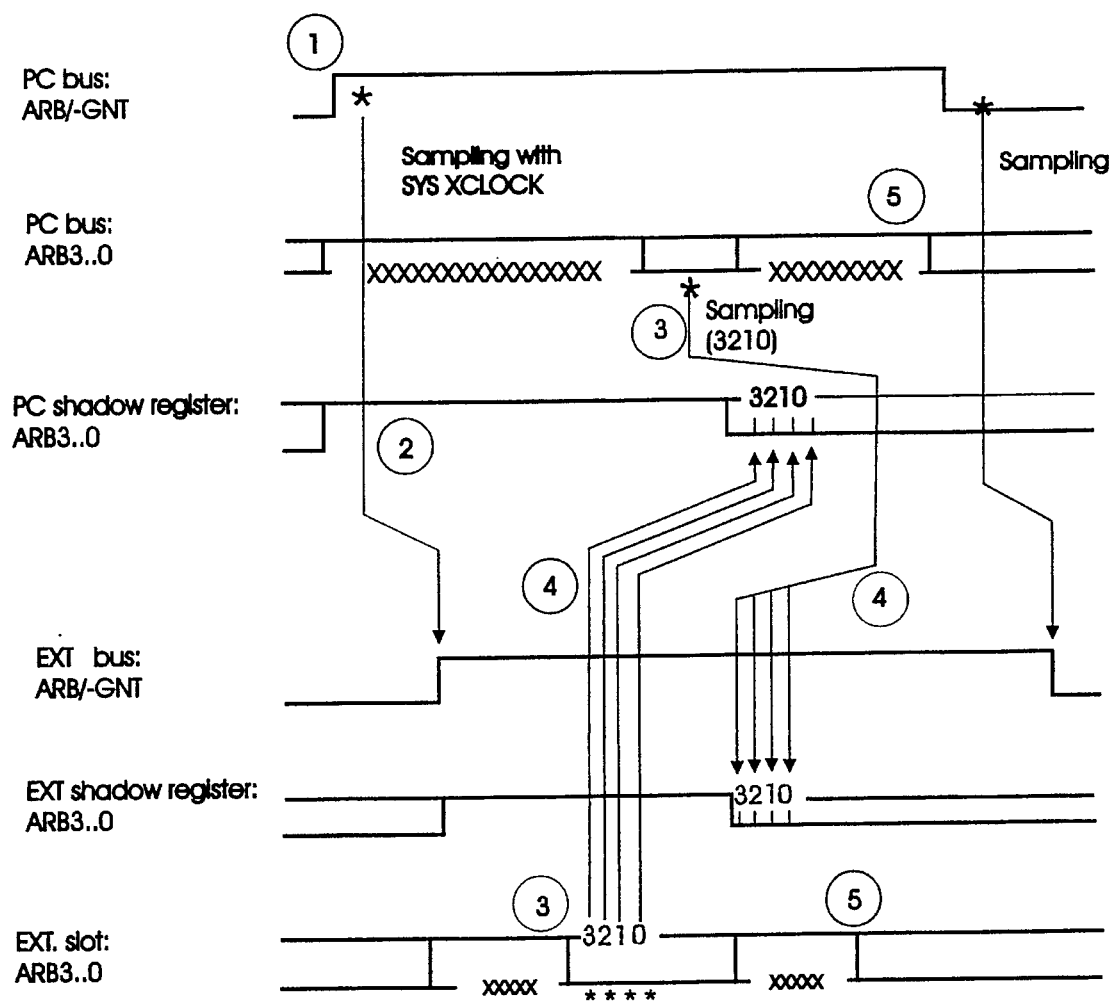
FIG. 32 is a timing chart which explains the operation of the remote arbiter 77 shown in FIG. 6.

FIG. 32 shows how arbitration is conducted. In this embodiment, a CACP is presupposed to be established in the personal computer 1.

In FIG. 31 and 32, the remote arbiter 77 operates as follows: the ARB/-GNT signal goes high in the personal computer 1, so that arbitration starts (1; see FIG. 32); XXXX in FIG. 32 denotes "under arbitration" and the mark * denotes that a signal on the bus is being sampled; this ARB/-GNT signal is transmitted through the 2-bit encoder 82, the modulator 84, the electro-opto conversion assembly 5, and the optical fiber assembly 2 to the expansion box 3, where arbitration is started as well (2); arbitration on the part of the personal computer 1 ends independently of arbitration on the part of the expansion box 3, and only winners in the arbitration are outputting ARBn signals to the ARBn lines of the MicroChannel bus (3); such winners' ARBn signals are sent through the 4-1 multiplexer 86 to the secondary system each other under the control of the transmission timing controller 80 (4); also, each ARBn from the secondary system is stored in the shadow register 73, and the second arbitration is conducted with a winner in the primary system;

the arbitration controller 79 is basically the same as the combination logic circuits of a local arbiter; finally, an actual equipment survives in either the personal computer 1 or the expansion box 3, and on the other hand, its corresponding arbitration controller 79 survives the arbitration (5); thus, the actual equipment as a survivor will conduct bus activities, but the arbitration controller 79 as a survivor does not take part in bus activities.

As indicated by a broken line in FIG. 31, the ARB/-GNT signal decoded by the decoder 83 in the remote arbiter 77 of the expansion box 3 is supplied to the ARB/-GNT line.

As shown in FIG. 32, the arbitration procedure of the expansion box 3 is so designed as to be completed in a shorter period than the arbitration procedure of the personal computer 1. This design can be realized by employing a more speedy technique, rather than those techniques shown in FIGS. 29 and 30, in the arbitration feature of the expansion box. Concretely speaking, an individual priority is set for each adapter slot, which is connected with a centralized arbitration feature through an arbitration line so that arbitration levels can be directly input from each slot into the arbitration feature. The arbitration feature then compares the arbitration levels thus input and supplies the highest priority level to all slots, which becomes a grant for a slot with the same highest level. Such a configuration as the above enables fast arbitration because the related devices do not compete with one another, as shown in FIGS. 29 and 30. In this case, the highest arbitration level in the personal computer 1 sent to the expansion box 3 is compared with the highest arbitration level in the expansion box 3 by the centralized arbitration feature during the second arbitration. By shortening the period of arbitration on the part of the expansion box 3, it is possible to gain considerable time to spare. This measure also makes it possible to compensate for any delay resulting from the elongation of the optical fiber assembly 2.

FIG. 33 shows the output of the 2-bit encoder 82 and the input of the 2-bit decoder 83. During the GNT period (when the ARB/-GNT signal is low), the code 01 is sent from the 2-bit encoder 82 through the modulator (a 2 bit to 1 bit multiplexer) 84 to the expansion box 3. During the ARB period, on the other hand, the code 10 is output from the 2-bit encoder 82. Correspondingly, an ARB/-GNT signal is generated on the bus of the expansion box.

Some specific code positions (timing slots) of the GNT period are used to send the primary arbitration level of a winner in arbitration. That is, on the part of the personal computer 1, code positions 16, 17, 18, and 19 are used to send ARBs 3, 2, 1 and 0. In this instance, the code 00 denotes level 0 and the code 11 denotes level 1. Also, the codes !A3, !A2, !A1, !A0 at code positions 20, 21, 22, and 23 correspond to the compensation code 11 or 00 of ARBn. The code CD as well is a compensation code for the offset adjustment of a grant period. This compensation code serves to suppress the direct current of signals. Also, on the part of the expansion box 3, these codes are sent through the use of code positions 8 to 15. Although the ARB/-GNT signal on the part of expansion box 3 need not be regenerated by the personal computer 1 because CACP is installed in the personal computer 1, the GNT period code, 01, and the ARB period code, 10, are sent to the personal computer 1 in order to determine the code positions of signals from the expansion box 3.

DMA synchronizer

The DMA synchronizer in FIG. 6 synchronizes the DMA controller with the DMA slave when they are present in different systems. The -TC and -CMD signals are sent from the DMA controller, whereas the -BURST signal is transferred from the DMA slave.

Clock transmitter-receiver

According to FIG. 6, clock pulses generated by the clock pulse generator 36 for data modulation and demodulation is fed through the electro-opto conversion assembly 5 and the optical fiber assembly 2 to the secondary system. On the other hand, clock pulses from the secondary system are regenerated in the electro-opto conversion assembly 5 to be used for demodulation. On the part of the expansion box 3, the clock detector 87 detects whether clock pulses are being received to bring about a transition from the standby state to the operating state after detection.

This invention is not limited to the above-described embodiment, but allows various modifications. In the above-mentioned embodiment, for example, three pairs of optical fibers were used; it is of course allowable to use one or two pairs of optical fibers instead. That is, two pairs of optical fibers would suffice for the same purpose if signals are all exchanged in packets. If, furthermore, clock pulses are regenerated by a PLL or the like on the part of the receiving end, even one pair of optical fibers would suffice for the same purpose. In the latter case, there is a need to insert a bit stream which does not occur in ordinary encoding system into packets to be interrupted when a packet with a higher priority should be sent interruptively; And the packet in question is discarded so that the packet with a higher priority can be sent instead. The discarded packet should be transmitted later again. Such interruption can be realized if the code "5B/6B," for instance, is used as encoding system. Again, the channels are not necessarily limited to optical fibers.

Explanation of Signals over MicroChannel Architecture

Signals over the MicroChannel architecture will be explained only in a degree to facilitate understanding. For details, refer to the "IBM Personal System/2 Hardware Interface Technical Reference."

-ADL: This signal line is driven by a control master. With this signal, a slave may latch an effective address and its status bit from the bus with ease.

-CD DS 16: This signal line is driven by 16-bit and 32-bit memory, I/O, or DMA slaves to indicate that a particular data port in addressed position has a 16-bit configuration or a 32-bit configuration.

-DS 16 RTN: This signal line is a negative ORing of the -CD DS 16 signal from each channel connector. It is asserted if any device makes its own -CD DS 16 active. This signal enables the control master to monitor data size information.

-S0, -S1: These signals not only start a channel cycle but also define the type of channel cycle. The use of these signals along with the M/-IO signal makes it possible to distinguish read or write access from/to memory or I/O slaves.

-CMD: This signal is used to define when data is valid on the data bus. The trailing edge of this signal indicates the end of a bus cycle.

CD CHRDY: This signal line is normally active (ready). It is made inactive (not ready) to afford additional time for the completion of a bus cycle by memory or I/O slaves.

CHRDYRTN: This signal line is ANDed output of the CD CHRDY signals. This signal is used by the control master to monitor ready information.

ARB0–ARB3: These signal lines make up an arbitration bus. The maximum value of the arbitration bus is given the lowest priority, whereas the minimum (hexadecimal '0') is given the highest priority. Each bus arbiter is allowed to change the state of the arbitration bus only when ARB/-GNT signal becomes high. Every bus arbiter monitors the arbitration bus. An arbiter with a lower priority gives up to compete by refraining from driving less-significant arbitration bits. The arbitration level of the highest priority requester is valid on the bus after a fixed settling time. After the channel is granted to a requester with the highest priority, the requester continues driving its own arbitration level on the bus.

ARB/-GNT: When this signal is high, it indicates that an arbitration cycle is in progress. The low state of this signal is an acknowledgement from the central arbitration control point to local arbiters and the DMA controller that channel ownership has been granted. This signal is driven to the high level by the central arbitration control point within a definite time after the -S0, -S1, -BURST, and -CMD signals are all inactivated. An arbitration cycle is started when the ARB/-GNT signal makes a transition from the low state to the high state, and the arbitration cycle is terminated when a transition is made from the high state to the low state. Only the central arbitration control point is allowed to drive this signal line.

-PREEMPT: This signal line is used by arbitration participants to request the use channel through arbitration.

An arbitrating participant that requests ownership of the bus drives -PREEMPT signal active, causing an arbitration cycle occur. When a participant is granted the ownership of bus, it stops driving -PREEMPT signal.

-BURST: This signal notifies the central arbitration control point that the granted controlling master will make a block data transfer. Controlling masters must stop driving -BURST signal before the end of its last bus cycle.

-TC: This signal line is driven by a DMA controller during the execution of a read or write command to notify the DMA slave that the current DMA channel has reached the terminal count. This signal indicates to the DMA slave of the final cycle of programmed data transfer.

-IRQ3–7, -IRQ9–12, and -IRQ14–15: These signal lines provide notification that devices are requesting attention. If a device sets one of the IRQ signals to its low level, an interrupt request is generated. The polarity of the IRQ signal is "active low" and multiple slaves can share one IRQ signal line.

-CHCK: This signal line is used to indicate a fatal error whereby the system can no longer continue operation.

-CHRESET: This signal is generated by a system logic circuit in order to reset or initialize all adapters when the power is turned on or the voltage from the power-supply-unit drops.

Advantages of the invention

As described above, this invention allows wired-OR signal lines of buses to be connected while level interlock is avoided even if the buses are connected by a communication path that is different from an ordinary bus signal line.

It should be apparent to those skilled in the art that many changes can be made in the details and arrangements of steps and parts without departing from the scope of the invention as defined in the appended claims.

What is claimed is:

1. A computer system including a first system, a second system, and a signal transfer path for connecting a bus of said first system and a bus of said second system, wherein said buses have multi level logical signal lines and wherein signals are transferred over said signals transfer path in a mode different from those of said buses, comprising:

a first detection means for detecting a logical level on the signal lines of the bus of said first system;

a second detection means for detecting a logical level on the signal lines of the bus of said second system;

a first transfer means responsive to detection by said first detection means, for transferring predetermined signals representing corresponding detected logical level to said second system through said signal transfer path;

a second transfer means responsive to detection by said second detection means, for transferring predetermined signals representing corresponding detected logical level to said first system through said signal transfer path;

a first signal restoring means, in said first system, responsive to said predetermined signals sent for restoring said predetermined signals sent by said second system to corresponding logical level of said signal lines of the bus of said second system and outputting said restored levels on said signal lines of the bus of said first system;

a second signal restoring means in said second system responsive to said predetermined signals sent for restoring said predetermined signals sent by said second system to corresponding logical level of said signal lines of the bus of said first system and outputting said restored levels on said signal lines of the bus of said second system;

a first blocking means for blocking operation of said first transfer means when outputs from said first signal restoring means are on a predetermined level; and a second blocking means for blocking operation of said second transfer means when outputs from said second signal restoring means are on a predetermined level.

2. A computer system as set forth in claim 1 wherein signal lines comprise interruption signal lines.

3. A computer system as set forth in claim 1 wherein said signal transfer path includes signal lines for transferring packeted signals.

4. A computer system as set forth in claim 1 wherein said signal transfer path is composed of optical fibers.

5. The computer system of claim 1, wherein said first restoring means includes a first register for storing said predetermined signals sent from the second system; and a second register for storing said predetermined signals send from said first system.

6. The computer system of claim 5 further comprising:

a third register forming a mirror image of said second register in said first system;

a fourth register forming a mirror image of said first register in said second system;

wherein said first transfer means transfers signals to said second system when levels detected by said first detection means are different from levels of said third register; and wherein said second transfer means transfers signals to said first system when levels detected by said second detection means are different from levels of said fourth register.

7. The computer system of claim 5 further comparing
a first register setting means responsive to said predetermined signals sent to said first system, for setting said levels of said first register to those of said wired-OR signal lines of said bus of said second system;

a second register setting means responsive to said predetermined signals sent to said second system, for setting said levels of said second register to those of said wired-OR signal lines of said bus of said first system; and a third blocking means for blocking operation of either said first or second register setting means when said predetermined signals are simultaneously transferred to both said first and second systems.

* * * * *